(12) United States Patent
Vijayan et al.

(10) Patent No.: US 10,126,949 B2
(45) Date of Patent: Nov. 13, 2018

(54) SHARED LIBRARY IN A DATA STORAGE SYSTEM

(71) Applicant: Commvault Systems, Inc., Tinton Falls, NJ (US)

(72) Inventors: Manoj Kumar Vijayan, Marlboro, NJ (US); Rajiv Kottomtharayil, Marlboro, NJ (US); Jaidev Oppath Kochunni, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 15/682,245

(22) Filed: Aug. 21, 2017

(65) Prior Publication Data

US 2018/0067654 A1     Mar. 8, 2018

Related U.S. Application Data

(63) Continuation of application No. 14/929,014, filed on Oct. 30, 2015, now abandoned, which is a continuation of application No. 13/788,403, filed on Mar. 7, 2013, now Pat. No. 9,189,167.

(60) Provisional application No. 61/653,974, filed on May 31, 2012.

(51) Int. Cl.
  *G06F 12/00*   (2006.01)
  *G06F 3/06*    (2006.01)

(52) U.S. Cl.
  CPC .......... *G06F 3/0608* (2013.01); *G06F 3/0605* (2013.01); *G06F 3/0631* (2013.01); *G06F 3/0644* (2013.01); *G06F 3/0659* (2013.01); *G06F 3/0686* (2013.01)

(58) Field of Classification Search
  CPC .... G06F 3/0644; G06F 3/0686; G06F 3/0631; G06F 3/0605
  See application file for complete search history.

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |
| 4,283,787 A | 8/1981 | Chambers |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.

(Continued)

*Primary Examiner* — Matthew Bradley
*Assistant Examiner* — Alan Otto
(74) *Attorney, Agent, or Firm* — Knobbe, Martens, Olson & Bear, LLP

(57) ABSTRACT

The library server according to certain aspects can manage the use of tape drives according to the data requirements of different storage operation cells. The library server according to certain aspects can also facilitate automatic management of tape media in a tape library by allocating the tapes and slots to different cells. For instance, the library server can manage the positioning and placement of the tapes into appropriate slots within the tape library.

20 Claims, 14 Drawing Sheets

(56) References Cited

U.S. PATENT DOCUMENTS

| | | | |
|---|---|---|---|
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,076,327 B1 * | 7/2006 | Desai | G06F 3/0613 700/213 |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,320,131 B1 | 1/2008 | O'toole, Jr. et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,046,560 B1 | 10/2011 | Voorhees | |
| 8,170,995 B2 | 5/2012 | Prahlad et al. | |
| 8,229,954 B2 | 7/2012 | Kottomtharayil et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 9,065,853 B2 | 6/2015 | Dorbes et al. | |
| 9,189,167 B2 | 11/2015 | Vijayan et al. | |
| 2004/0044772 A1 * | 3/2004 | Harkin | H04L 63/083 709/227 |
| 2005/0256999 A1 | 11/2005 | Kishi et al. | |
| 2006/0224846 A1 | 10/2006 | Amarendran et al. | |
| 2006/0235892 A1 | 10/2006 | Kalach et al. | |
| 2008/0028009 A1 | 1/2008 | Ngo | |
| 2008/0294698 A1 | 11/2008 | Fujimoto | |
| 2009/0064286 A1 | 3/2009 | Murphy | |
| 2009/0288084 A1 | 11/2009 | Astete et al. | |
| 2009/0319534 A1 | 12/2009 | Gokhale | |
| 2010/0254241 A1 * | 10/2010 | Aoki | G06F 3/0605 369/84 |
| 2010/0312944 A1 * | 12/2010 | Walker | G06F 12/0215 711/5 |
| 2011/0179240 A1 * | 7/2011 | Sukonik | G06F 13/18 711/158 |
| 2012/0150818 A1 | 6/2012 | Vijayan Retnamma et al. | |
| 2012/0150826 A1 | 6/2012 | Vijayan Retnamma et al. | |
| 2013/0198468 A1 | 8/2013 | Antony et al. | |
| 2015/0301748 A1 | 10/2015 | Lee | |
| 2016/0192178 A1 | 6/2016 | Blong | |
| 2017/0060918 A1 | 3/2017 | Iyer et al. | |
| 2017/0228257 A1 | 8/2017 | Dong et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

* cited by examiner

SHARED LIBRARY IN A DATA STORAGE SYSTEM

This application is a continuation of U.S. patent application Ser. No. 14/929,014, filed on Oct. 30, 2015, which is a continuation of U.S. patent application Ser. No. 13/788,403, filed on Mar. 7, 2013, which claims the benefit of priority under 35 U.S.C. § 119(e) of U.S. Provisional Application No. 61/653,974 filed on May 31, 2012 and entitled "SHARING A COMMON TAPE LIBRARY AMONG MULTIPLE STORAGE OPERATION CELLS IN A DATA STORAGE SYSTEM", the entirety of which is incorporated herein by reference. Any and all priority claims identified in the Application Data Sheet, or any correction thereto, are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

Because of the substantial storage capacity of tape libraries and other high-capacity storage devices, such devices can in some cases be underutilized. This may be the case where a tape library is dedicated to serving the storage needs of a single entity. For instance, such underutilization can occur where a tape library is dedicated to a data management system or subsystem corresponding to a single enterprise, a single department within an enterprise, or the like. Thus, it can be beneficial to allow multiple data management entities to share a common tape library and thereby utilize the available storage space in an efficient manner. Thus, embodiments described herein provide a mechanism for sharing a tape library. For instance, in some embodiments, a tape library is shared across multiple cells within a larger data storage system. Or, the tape library may be shared across multiple data storage systems, such as data storage systems of different companies or other organizations.

Where a single tape library (or other type storage device) is shared amongst multiple storage operation cells (or other client entities), the relative data storage demands of the various cells can differ. Moreover, the relative demand can change over time. For instance, the demands for a particular storage operation cell may increase significantly during a nightly scheduled backup operation. Thus, if drives in the shared library are partitioned in a fixed manner among storage operation cells, inefficient allocation of storage resources can occur. For instance, a storage operation cell with higher data storage needs may require more drives than the number of drives assigned to it. On the other hand, another storage operation cell may not need all the drives assigned to it, resulting in some of the drives being idle.

Due to the above challenges, there is a need for an arbiter that manages the sharing of tape libraries among the multiple storage operation cells. In order to address these and other challenges, a library server is provided to manage the sharing of a common tape library (or other data storage device) among multiple storage operation cells (or other client entities), and more particularly, manage and oversee the leasing of tape drives and allocation of tapes to various storage operation cells.

The library server according to certain aspects communicates with multiple storage operation cells in order to manage leasing of tape drives and allocation of tape media. The library server receives lease requests for tape drives from the various cells and processes the requests to lease out drives. A lease request may specify certain information associated with the request, such as the number of drives, the estimated duration of the lease, and priority information relating to the request, if any. By using a lease-based model, the library server can distribute the use of the tape drives across storage operation cells according to the data requirements of each cell. In this manner, the library server can improve drive utilization and reduce the amount of drives in the shared library that are idle.

Where a tape library is used, the library server may also allocate the media in the tape library amongst the storage operation cells. The tapes can be allocated to storage operation cells in various ways. In one embodiment, tapes are allocated to cells by bar code ranges. That is, one cell is assigned to a first bar code range, and another cell is assigned to a second bar code range. The library server may also allocate the slots within the tape library to different storage operation cells. For example, the slots may be numbered, and slots in a particular range can be allocated to a specific storage operation cell.

If tapes and slots are allocated to different storage operation cells, the library server can also manage the positioning of the tapes within the tape library. For instance, a new tape that is added to the tape library belongs to a particular storage operation cell, and the library server automatically places the tape in a slot that is allocated to that cell. In addition, if a tape belonging to a particular storage operation cell is incorrectly placed in a slot allocated to a different storage operation cell, the library server automatically moves the tape to a slot in the slot range allocated for that storage operation cell.

In this manner, the library server can serve as the central arbiter for the tape library and facilitate more efficient use of tape drives. By adopting a lease-based model, the library server can maximize the use of the drives and make sure that no drives are idle. In addition, the library server can manage the use of the tape drives according to the data requirements of different storage operation cells. The library server can also facilitate automatic management of tape media in the tape library by allocating the tapes and slots to different cells. For instance, the library server can manage the positioning and placement of the tapes into appropriate slots within the tape library.

According to certain embodiments, a method is provided for administering access to a tape data storage library that is shared amongst a plurality of data storage cells to manage copies of production data. The method comprises allocating, by a library arbiter module executing on one or more computer processors and for each respective data storage cell of a plurality of data storage cells, a subset of storage space in a tape data storage library for use by the respective data storage cell, where access to the tape data storage library is shared by the data storage cells and each of the data storage cells comprises one or more client computing devices having at least one software application executing thereon generating production data. The method further comprises receiving, by the library arbiter module and from a first data storage cell of the plurality of data storage cells, a request to access the subset of storage space allocated to the first data storage cell, automatically scheduling, by the library arbiter module, the request in relation to requests for access to the tape data storage library by others of the plurality of data storage cells, and based on the scheduling, providing the first data storage cell with temporary access to its allocated subset of storage space in the tape data storage library.

According to another aspect of the disclosure, a method of administering access to a data storage library that is shared amongst a plurality of data storage systems to manage copies of production data is provided. The method comprises allocating, by a library arbiter module executing on one or more computer processors and for each respective data storage system of a plurality of data storage systems, a subset of storage space in a data storage library for use by the respective data storage system wherein access to the data storage library is shared by the data storage systems. The method further comprises receiving, by the library arbiter module and from a first data storage system of the plurality of data storage systems, a request to access the subset of storage space allocated to the first data storage system, automatically scheduling, by the library arbiter module, the request in relation to requests for access to the storage library by others of the plurality of data storage systems, and based on the scheduling, providing the first data storage system with temporary access to its allocated subset of storage space in the storage library.

In some embodiments, a data storage system is provided that is configured to administer access to a tape data storage library that is shared amongst a plurality of data storage cells to manage copies of production data. The system comprises a library arbiter module executing on one or more computer processors and configured to allocate, for each respective data storage cell of a plurality of data storage cells, a subset of storage space in a tape data storage library for use by the respective data storage cell, where access to the tape data storage library is shared by the data storage cells and each of the data storage cells comprises one or more client computing devices having at least one software application executing thereon generating production data. The module is further configured to receive, from a first data storage cell of the plurality of data storage cells, a request to access the subset of storage space allocated to the first data storage cell, automatically schedule the request in relation to requests for access to the tape data storage library by others of the plurality of data storage cells, and based on the scheduling, provide the first data storage cell with temporary access to its allocated subset of storage space in the tape data storage library.

According to certain embodiments, a data storage system configured to administer access to a data storage library that is shared amongst a plurality of data storage systems to manage copies of production data is provided. The system comprises a library arbiter module executing on one or more computer processors and configured to allocate, for each respective data storage system of a plurality of data storage systems, a subset of storage space in a data storage library for use by the respective data storage system, where access to the data storage library is shared by the data storage systems and each of the data storage systems comprises one or more client computing devices having at least one software application executing thereon generating production data. The module is further configured to receive, from a first data storage system of the plurality of data storage systems, a request to access the subset of storage space allocated to the first data storage system, automatically schedule the request in relation to requests for access to the data storage library by others of the plurality of data storage systems, and based on the scheduling, provide the first data storage system with temporary access to its allocated subset of storage space in the data storage library.

BRIEF DESCRIPTION OF THE DRAWINGS

FIGS. 2A, 2A-1, and 2A-2 are block diagrams illustrating another example data storage system that including a library server managing the allocation of a shared library amongst multiple storage operation cells.

DETAILED DESCRIPTION

Systems and methods are described herein for implementing a shared library in a data storage system. Examples of such systems and methods are discussed in further detail herein, e.g., with respect to FIGS. 2-7. Administrating access to a shared data storage library may additionally be implemented by information management systems such as those that will now be described with respect to FIGS. 1A-1E. And, as will be described, the componentry and methods for implementing shared access to a data storage library described herein can be incorporated into and implemented by such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
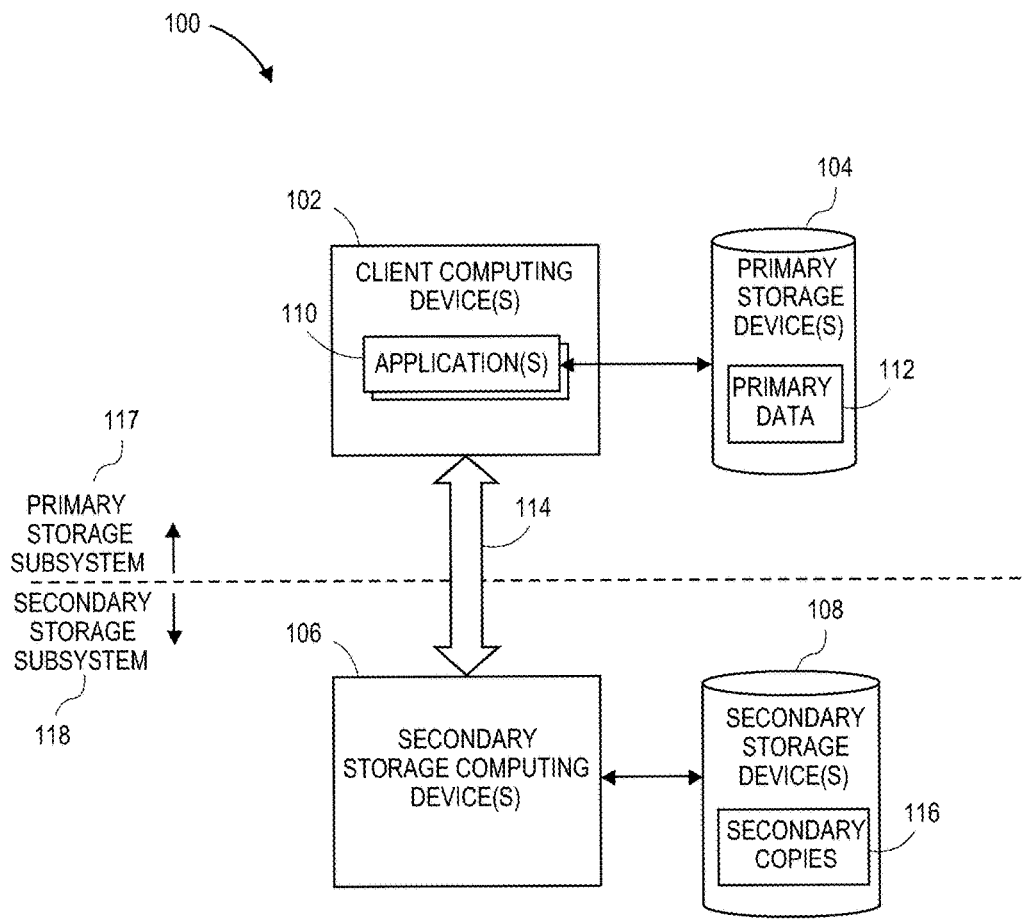
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
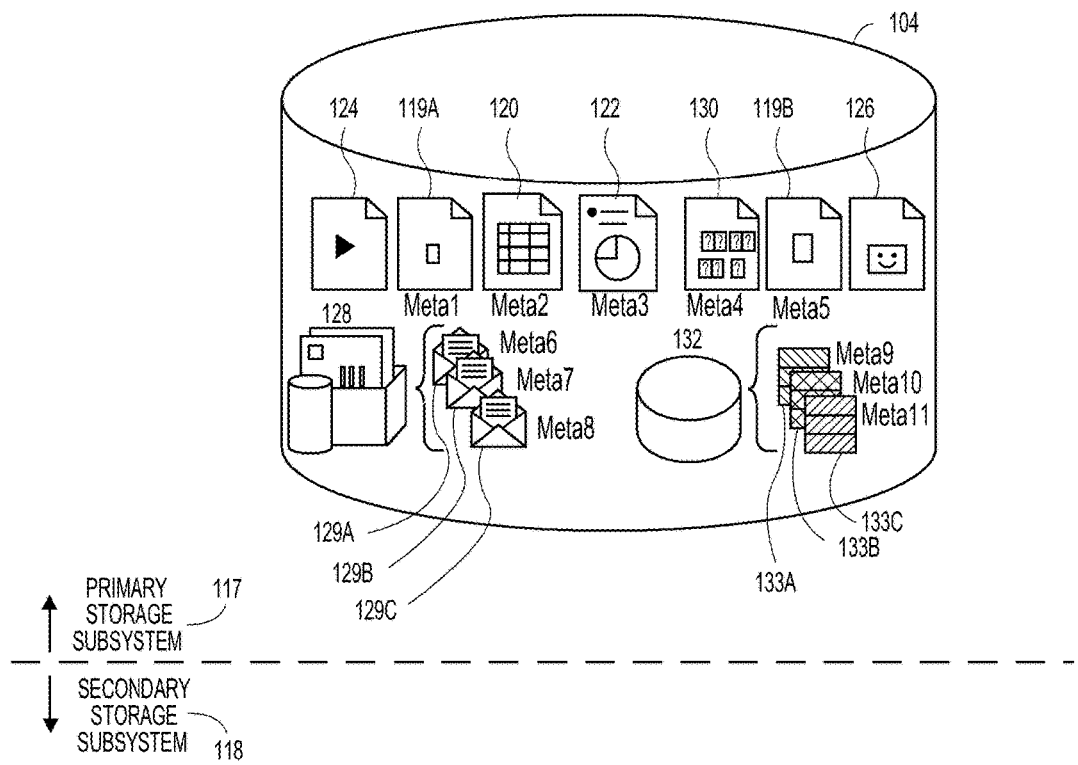
FIG. 1B is a detailed view of a primary storage device, a secondary storage device, and some examples of primary data and secondary copy data.
Figure 1B:
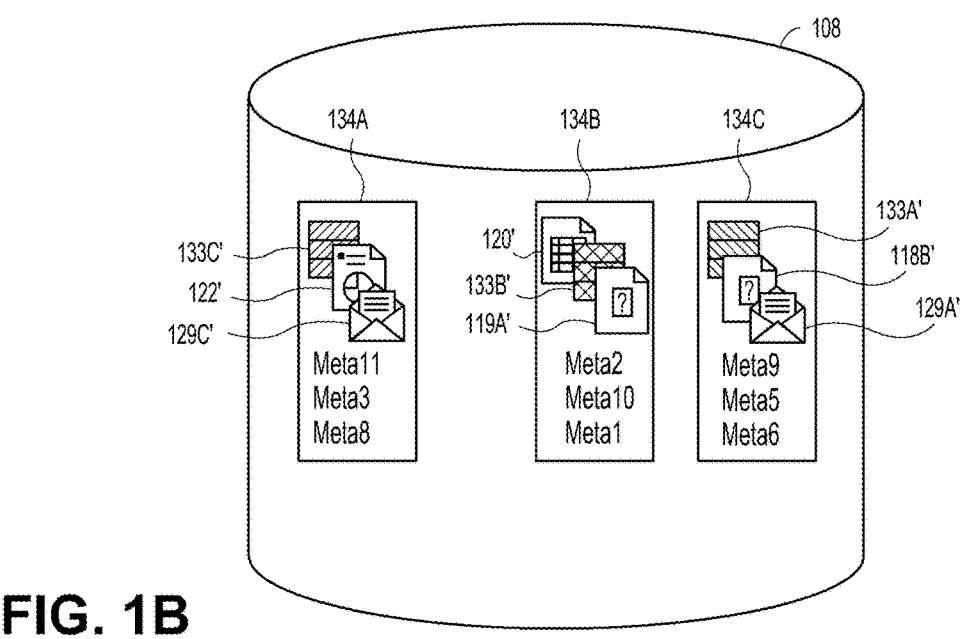

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
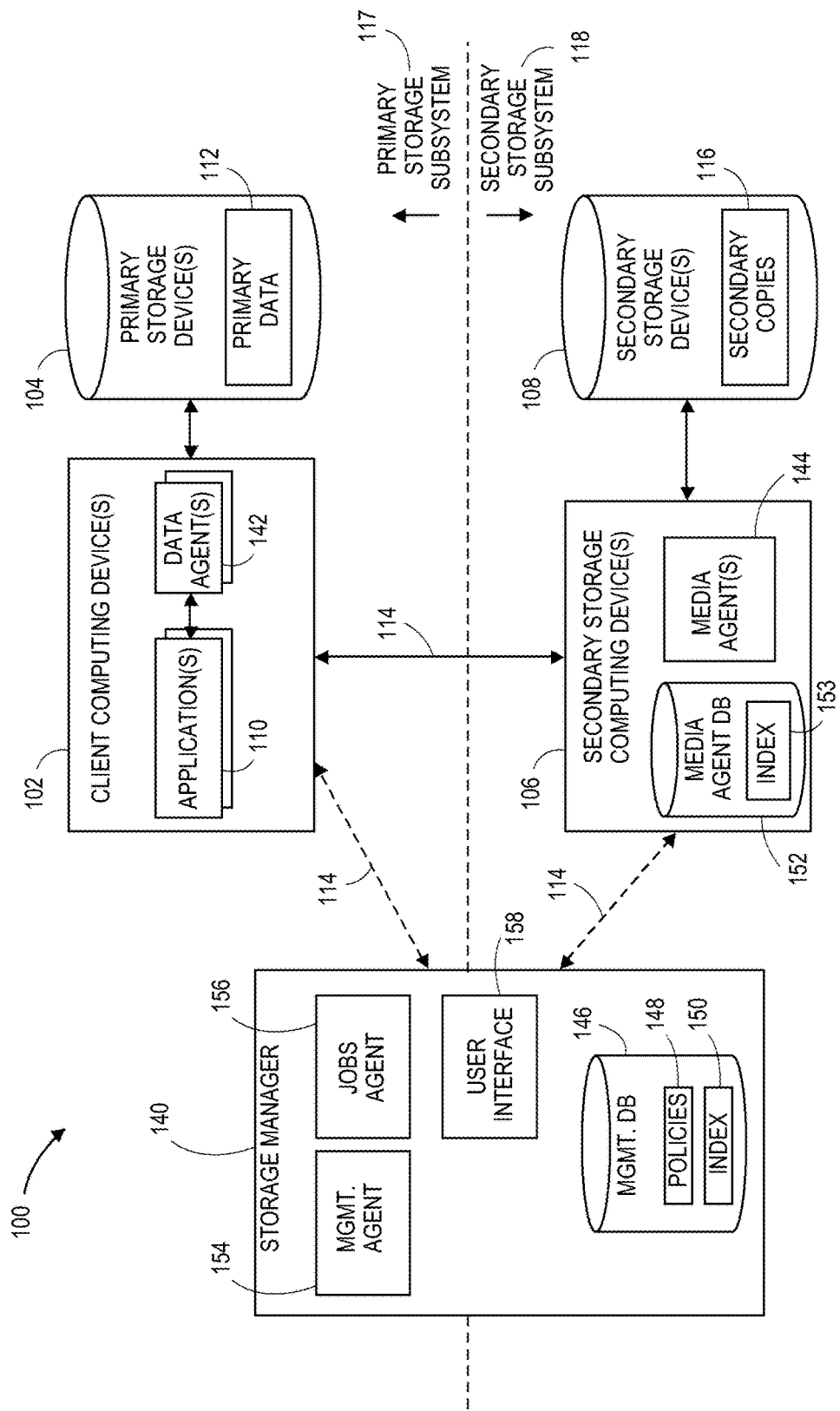
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
   initiating execution of secondary copy operations;
   managing secondary storage devices 108 and inventory/capacity of the same;
   allocating secondary storage devices 108 for secondary storage operations;
   monitoring completion of and providing status reporting related to secondary storage operations;
   tracking age information relating to secondary copies 116, secondary storage devices 108, and comparing the age information against retention guidelines;
   tracking movement of data within the information management system 100;
   tracking logical associations between components in the information management system 100;
   protecting metadata associated with the information management system 100; and
   implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
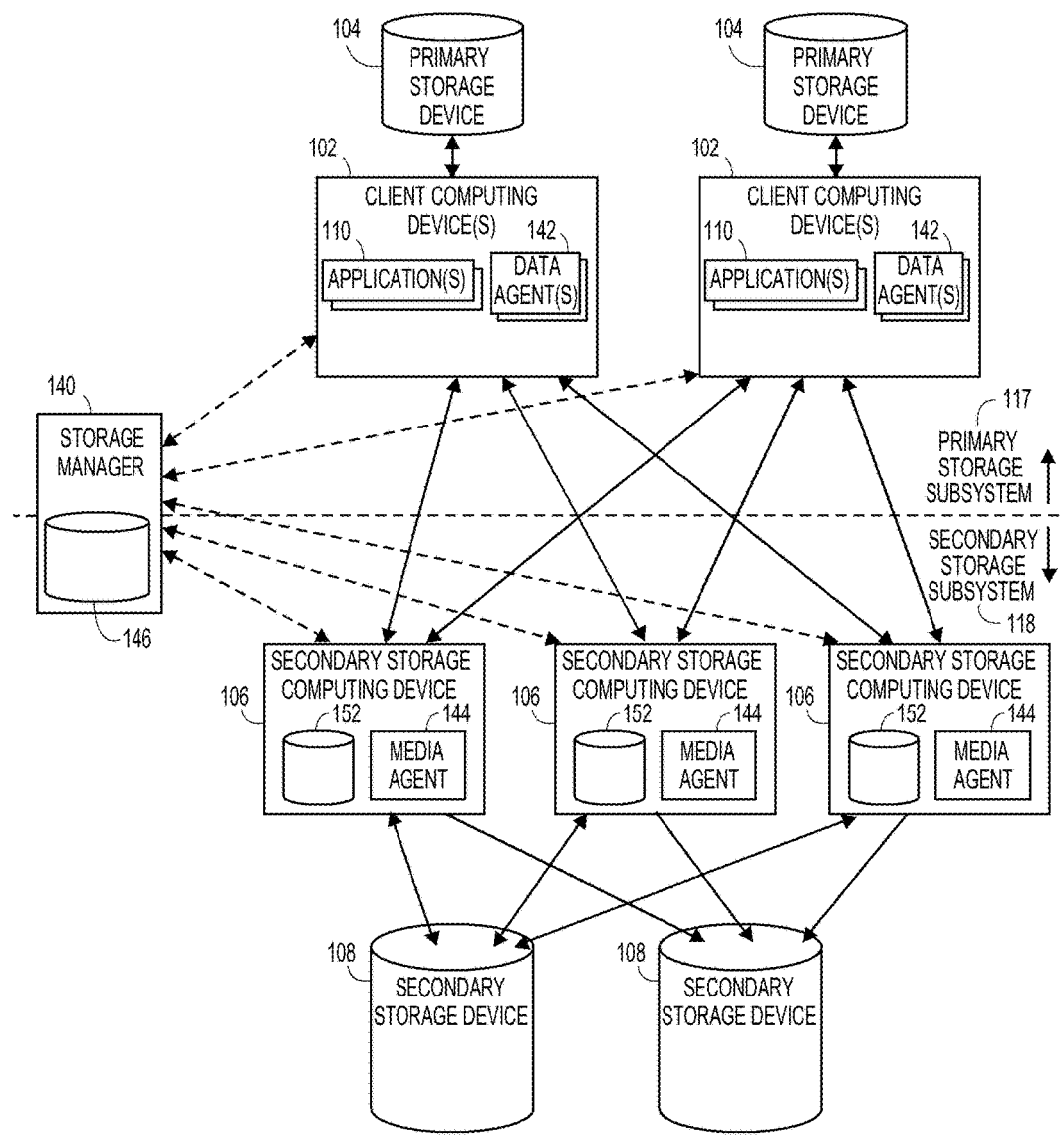
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
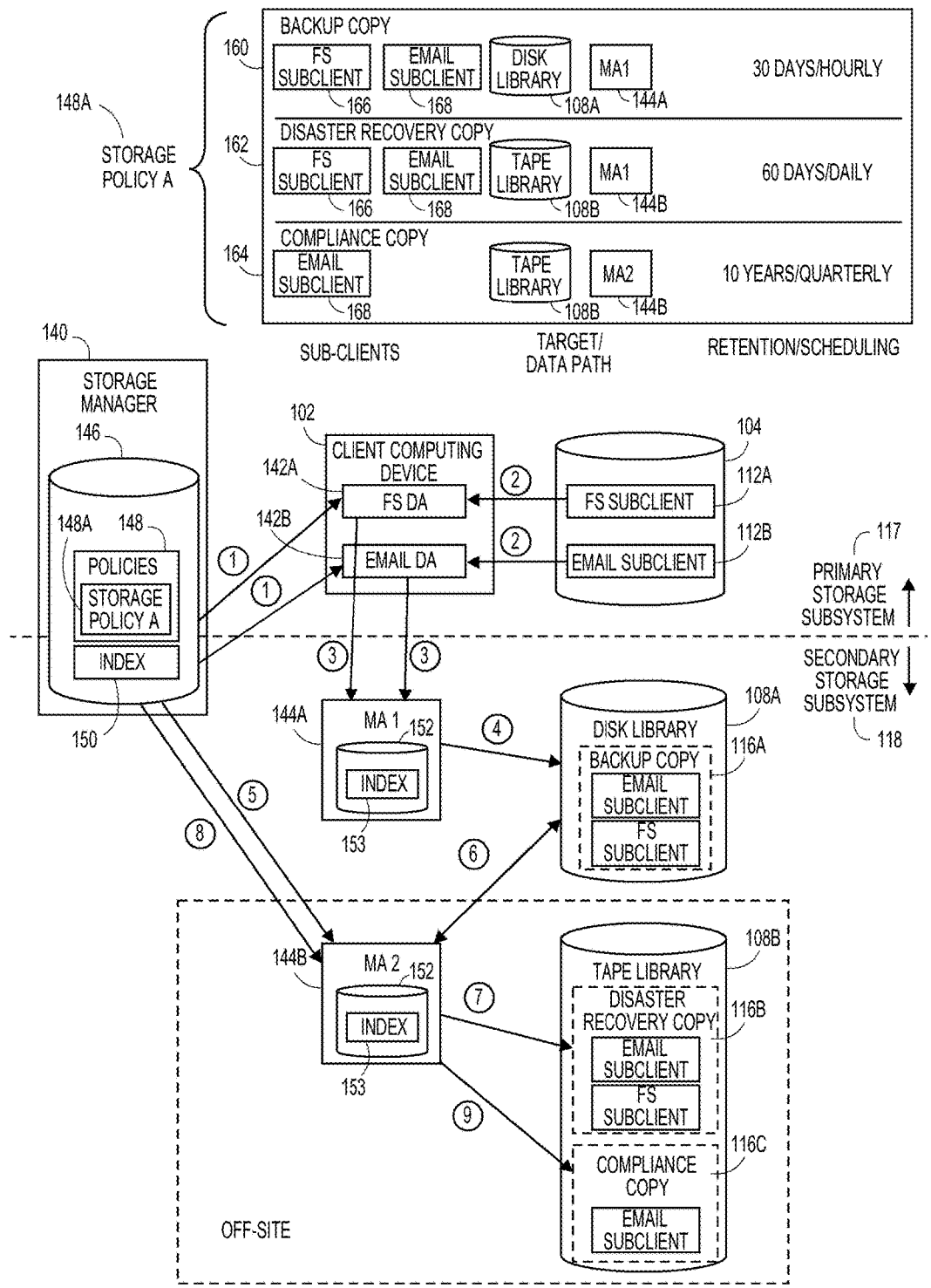
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

Figure 2:
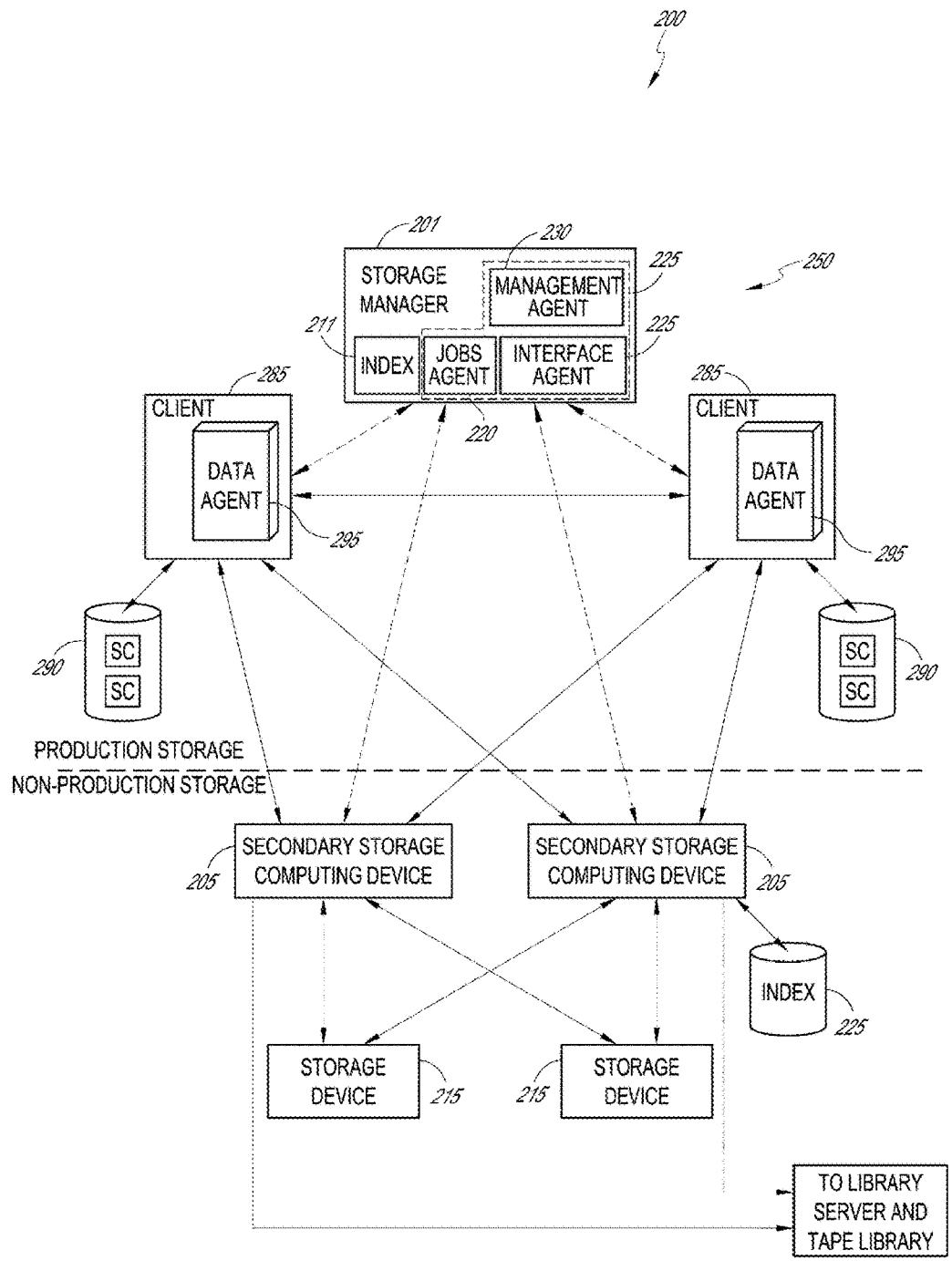
FIG. 2 is a block diagram illustrating an example arrangement of resources in a storage operation cell within a data storage system.

FIG. 2 is a block diagram illustrating an example arrangement of resources in a storage operation cell that can be one of a plurality of storage operation cells that share a common set of media, like a tape library. The tape library can be managed by a central arbiter. Such a configuration is shown and described throughout this disclosure, for example, with respect to FIGS. 2A-7. As shown, storage operation cell 250 may generally include a storage manager 201, a data agent 295, a media agent 205, a storage device 215, and, in some embodiments, may include certain other components such as a client 285, a data or information store 290, database or index 211, jobs agent 220, an interface module 225, and a management agent 230. Such system and elements thereof are exemplary of a modular storage system such as the CommVault Simpana Information Management Software system, available from CommVault Systems, Inc. of Oceanport, N.J., aspects of which are further described in U.S. patent application Ser. No. 09/610,738, which is incorporated herein by reference in its entirety.

A storage operation cell, such as cell 250, may generally include combinations of hardware and software components associated with performing storage operations on electronic data. According to some embodiments of the present disclosure, storage operations cell 250 may be related to backup cells and provide some or all of the functionality of backup cells as described in U.S. patent application Ser. No. 09/354,058, which is hereby incorporated by reference in its entirety. However, in certain embodiments, storage operation cells may also perform additional types of storage operations and other types of storage management functions that are not generally offered by backup cells.

In accordance with certain embodiments of the present disclosure, additional storage operations performed by storage operation cells may include creating, storing, retrieving, and migrating production data (e.g., primary copy data) (e.g., 290) and non-production data (e.g., secondary copy data) (which may include, for example, snapshot copies, backup copies, HSM copies, archive copies, and other types of copies of electronic data) stored on storage devices 215. In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. Exemplary storage policies are described above, and in some embodiments, a storage policy can be any of the storage policies described above with respect to FIGS. 1C-1E. A storage policy is generally a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, other criteria relating to a storage operation, combinations of the same and the like. Thus, in certain embodiments, a storage policy may indicate that certain data is to be stored in a specific storage device, retained for a specified period of time before being aged to another tier of secondary storage, copied to secondary storage using a specified number of streams. A storage policy may be stored in the storage manager database 211, to archive media as metadata for use in restore operations or other storage operations, or to other locations or components of the system.

In certain embodiments, a schedule policy may specify when to perform storage operations and how often and may also specify performing certain storage operations on sub-clients of data and how to treat those sub-clients. A sub-client may represent static or dynamic associations of portions of data of a volume and are typically mutually exclusive. Thus, in certain embodiments, a portion of data may be given a label and the association is stored as a static entity in an index, database or other storage location used by the system. Sub-clients may also be used as an effective administrative scheme of organizing data according to data type, department within the enterprise, storage preferences, combinations of the same or the like.

For example, an administrator may find it preferable to separate e-mail data from financial data using two different sub-clients having different storage preferences, retention criteria, or the like. Storage operation cells may contain not only physical devices, but also may represent logical concepts, organizations, and hierarchies. For example, a first storage operation cell 250 may be configured to perform a first type of storage operations such as HSM operations, which may include backup or other types of data migration, and may include a variety of physical components including the storage manager 201 (or management agent 230), the media agent 205, the client component 285, and other components as described herein. A second storage operation cell may contain the same or similar physical components, however, it may be configured to perform a second type of storage operations such as SRM operations, and may include as monitoring a primary data copy or performing other known SRM operations.

Thus, as can be seen from the above, although the first and second storage operation cells are logically distinct entities configured to perform different management functions (i.e., HSM and SRM respectively), each cell may contain the same or similar physical devices in both storage operation cells. Alternatively, in other embodiments, different storage operation cells may contain some of the same physical devices and not others. For example, a storage operation cell configured to perform SRM tasks may contain the media agent 205, client 285, or other network device connected to a primary storage (e.g., production storage) volume, while a storage operation cell configured to perform HSM tasks may instead include a media agent 205, client 285, or other network device connected to a secondary storage (e.g., non-production storage) volume and not contain the elements or components associated with and including the primary storage volume. These two cells, however, may each include a different storage manager that coordinates storage operations via the same media agents 205 and storage devices 215. This "overlapping" configuration allows storage resources to be accessed by more than one storage manager 201 such that multiple paths exist to each storage device 215 facilitating failover, load balancing and promoting robust data access via alternative routes.

Alternatively, in some embodiments, the same storage manager 201 may control two or more cells 250 (whether or not each storage cell 250 has its own dedicated storage manager). Moreover, in certain embodiments, the extent or type of overlap may be user-defined (e.g., through a control console) or may be automatically configured to optimize data storage and/or retrieval.

Data agent 295 may be the same or similar to the data agents 142 described with respect to FIGS. 1C-1E, and may be a software module or part of a software module that is generally responsible for copying, archiving, migrating, and recovering data from client computer 285 stored in an information store 290 or other memory location. Each client computer 285 may have at least one data agent 295 and the system can support multiple client computers 285. In some embodiments, data agents 295 may be distributed between client 285 and storage manager 201 (and any other intermediate components) or may be deployed from a remote location or its functions approximated by a remote process that performs some or all of the functions of data agent 295.

Embodiments of the present disclosure may employ multiple data agents 295 each of which may backup, migrate, and recover data associated with a different application. For example, different individual data agents 295 may be designed to handle Microsoft Exchange data, Lotus Notes data, Microsoft Windows file system data, Microsoft Active Directory Objects data, and other types of data. Other embodiments may employ one or more generic data agents 295 that can handle and process multiple data types rather than using the specialized data agents described above.

If a client computer 285 has two or more types of data, one data agent 295 may be required for each data type to copy, archive, migrate, and restore the client computer 285 data. For example, to backup, migrate, and restore all of the data on a Microsoft Exchange server, the client computer 285 may use one Microsoft Exchange Mailbox data agent 295 to backup the Exchange mailboxes, one Microsoft Exchange Database data agent 295 to backup the Exchange databases, one Microsoft Exchange Public Folder data agent 295 to backup the Exchange Public Folders, and one Microsoft Windows File System data agent 295 to backup the client computers 285 file system. In such embodiments, these data agents 295 may be treated as four separate data agents 295 by the system even though they reside on the same client computer 285.

Alternatively, other embodiments may use one or more generic data agents 295, each of which may be capable of handling two or more data types. For example, one generic data agent 295 may be used to back up, migrate and restore Microsoft Exchange Mailbox data and Microsoft Exchange Database data while another generic data agent may handle Microsoft Exchange Public Folder data and Microsoft Windows File System data, or the like.

Data agents 295 may be responsible for arranging or packing data to be copied or migrated into a certain format such as an archive file. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents may be tracked within the system by updating indexes associated appropriate storage managers or media agents.

Generally speaking, storage manager 201 may be the same or similar to the storage managers 140 described with respect to FIGS. 1C-1E, and can be a software module or other application that coordinates and controls storage operations performed by storage operation cell 250. Storage manager 201 may communicate with some or all elements of storage operation cell 250 including client computers 285, data agents 295, media agents 205, and storage devices 215, to initiate and manage system backups, migrations, and data recovery.

Storage manager 201 may include a jobs agent 220 that monitors the status of some or all storage operations previously performed, currently being performed, or scheduled to be performed by storage operation cell 250. Jobs agent 220 may be communicatively coupled with an interface agent 225 (typically a software module or application). Interface agent 225 may include information processing and display software, such as a graphical user interface ("GUI"), an application program interface ("API"), or other interactive interface through which users and system processes can retrieve information about the status of storage operations. Through interface 225, users may optionally issue instructions to various storage operation cells 250 regarding performance of the storage operations as described and contemplated by the present disclosure. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device).

Storage manager 201 may also include a management agent 230 that is typically implemented as a software module or application program. In general, management agent 230 provides an interface that allows various management components 201 in other storage operation cells 250 to communicate with one another. For example, assume a certain network configuration includes multiple cells 250 adjacent to one another or otherwise logically related in a WAN or LAN configuration (not shown). With this arrangement, each cell 250 may be connected to the other through each respective interface agent 225. This allows each cell 250 to send and receive certain pertinent information from other cells 250 including status information, routing information, information regarding capacity and utilization, or the like. These communication paths may also be used to convey information and instructions regarding storage operations.

For example, a management agent in a first storage operation cell may communicate with a management agent in a second storage operation cell regarding the status of storage operations in the second storage operation cell. Another illustrative example includes the case where a management agent in first storage operation cell communicates with a management agent 230 in a second storage operation cell to control the storage manager 201 (and other components) of the second storage operation cell via the management agent 230 contained in the storage manager 201.

Another illustrative example is the case where management agent 230 in the first storage operation cell 250 communicates directly with and controls the components in the second storage management cell 250 and bypasses the storage manager 201 in the second storage management cell. If desired, storage operation cells 250 can also be organized hierarchically such that hierarchically superior cells control or pass information to hierarchically subordinate cells or vice versa.

Storage manager 201 may also maintain an index, a database, or other data structure 211. The data stored in database 211 may be used to indicate logical associations between components of the system, user preferences, management tasks, media containerization and data storage information or other useful data. For example, the storage manager 201 may use data from database 211 to track logical associations between media agent 205 and storage devices 215 (or movement of data as containerized from primary to secondary storage).

The media agent 205 may be the same or similar to the media agents 144 described with respect to FIGS. 1C-1E. Generally speaking, a media agent, which may also be referred to as a secondary storage computing device 205, may be implemented as software module that conveys data, as directed by storage manager 201, between a client computer 285 and one or more storage devices 215 such as a tape library, a magnetic media storage device, an optical media storage device, or any other suitable storage device. The storage devices 215 may be a set of hard drives or other type of memory. The storage devices 215 are logically within and are generally dedicated to the individual storage operation cell 250. This is in contrast, the shared tape library (not shown), discussed in detail with respect to later figures, which is shared amongst multiple storage operation cells. In one embodiment, secondary computing device 205 may be communicatively coupled with and control a storage device 215. A secondary computing device 205 may be considered to be associated with a particular storage device 215 if that secondary computing device 205 is capable of routing and storing data to particular storage device 215.

In operation, a secondary computing device 205 associated with a particular storage device 215 may instruct the storage device to use a robotic arm or other retrieval means to load or eject a certain storage media, and to subsequently archive, migrate, or restore data to or from that media. Secondary computing device 205 may communicate with a storage device 215 via a suitable communications path such as a SCSI or fiber channel communications link. In some embodiments, the storage device 215 may be communicatively coupled to a data agent 205 via a storage area network ("SAN").

Each secondary storage computing device 205 may maintain an index, a database, or other data structure 206 which may store index data generated during backup, migration, and restore and other storage operations as described herein. For example, performing storage operations on Microsoft Exchange data may generate index data. Such index data provides a secondary computing device 205 or other external device with a fast and efficient mechanism for locating data stored or backed up. Thus, in some embodiments, a secondary storage computing device index 206, or a storage manager database 211, may store data associating a client 285 with a particular secondary computing device 205 or storage device 215, for example, as specified in a storage policy, while a database or other data structure in secondary computing device 205 may indicate where specifically the client 285 data is stored in storage device 215, what specific files were stored, and other information associated with storage of client 285 data. In some embodiments, such index data may be stored along with the data backed up in a storage device 215, with an additional copy of the index data written to index cache in a secondary storage device. Thus the data is readily available for use in storage operations and other activities without having to be first retrieved from the storage device 215.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 215. In some embodiments, the cached information may include information regarding format or containerization of archive or other files stored on storage device 215.

In some embodiments, certain components may reside and execute on the same computer. For example, in some embodiments, a client computer 285, such as a data agent 295 or a storage manager 201, coordinates and directs local archiving, migration, and retrieval application functions as further described in U.S. patent application Ser. No. 09/610, 738. This client computer 285 can function independently or together with other similar client computers 285.

Figure 2A:
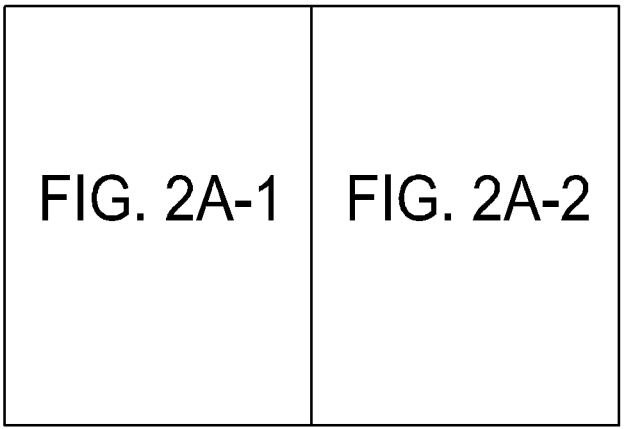

FIG. 2A is a block diagram illustrating another example data storage system that includes multiple storage operation cells. FIG. 2A shows an example configuration of a computing network 270, where a plurality of storage operation cells 250 can be managed by a master storage manager 272. In one embodiment, each of the storage operation cells 250 can be configured and operate in a manner similar to that described above in reference to FIG. 2. In one embodiment, the master storage manager 272 can be configured to provide management of inter-cell operations involving data management. In one embodiment, the inter-cell operations can involve at least some functionalities that are similar to those associated with the storage managers 201 described above in reference to FIG. 2. In FIG. 2A, the data storage system 200A also includes a library server 240A and a tape library 241A. The tape library 241A is shared by the plurality of storage operation cells 250. The library server 240A and the tape library 241A are communicatively coupled to the media agents 205 of the storage operation cells 250. The library server and the tape library will be discussed in more detail herein, e.g., with respect to FIGS. 3-6.

Figure 3:
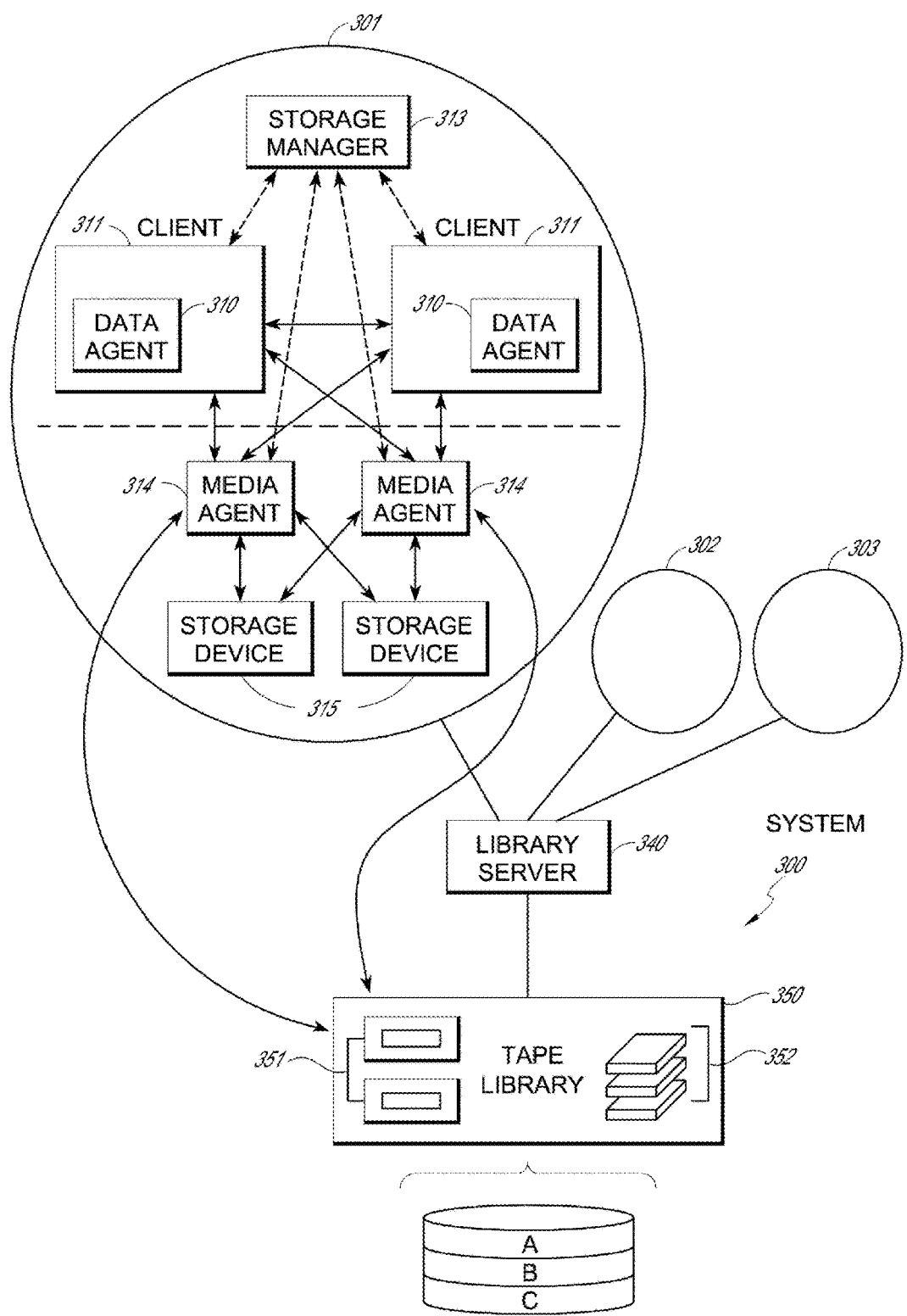
FIG. 3 is a block diagram of an example storage system configured to share a library among multiple storage operation cells according to certain embodiments.

FIG. 3 is a block diagram of an example storage system configured to share a tape library among multiple storage operation cells according to certain embodiments. The system 300 can be similar to systems shown in FIGS. 2 and 2A. The system 300 may include one or more storage operation cells 301, 302, and 303. A storage operation cell may include one or more of the following components: a data agent 310, a client 311, an information store 312, a storage manager 313, a media agent 314, and a storage device 315. The data agent 310, the client 311, the information store 312, the storage manager 313, the media agent 314, and the storage device 315 are similar to the data agent 295, the client 285, the information store 290, the storage manager 201, the media agent 205, and the storage device 215 shown in FIGS. 2 and 2A, respectively. The system 300 may also include a library server 340 and a tape library 350, which can be similar to the library server 240A and the tape library 241A in FIG. 2A.

The library server 340 generally manages sharing of one or more common tape libraries among multiple storage operation cells. The library server 340 may be a separate and/or dedicated server or other type of computing device. In one embodiment, the library server 340 is configured as part of a media agent. For example, the first media agent to be set up in the system 300 could be configured to act as the library server 340. A media agent configured to serve as a library server may or may not also perform the functions of a typical media agent. In certain embodiments, the library server 340 is distributed across several media agents 314. The library server 340 could have access to the arm or medium changer of the tape library 350. The arm or medium changer handles the physical movement of tapes 352. The library server 340 may or may not have access to the tape drives 351. The library server 340 will be discussed in more detail with respect to FIGS. 4-6.

The tape library 350 can include one or more tape drives 351 and one or more tapes 352. The tape drives 351 can be hardware devices into which the tapes 352 are inserted, and which read data from or write data to the tapes 352. In general, the tape library 350 includes more than one tape drive so that data can be written and read in parallel. The tapes 352 can be identified by an identifier, such as a barcode. The tape library 350 can be structured to include tape slots, and the tapes 352 are placed and arranged in the tape slots. The tape library 350 may include an arm or medium changer that handles the physical movement of the tapes 352. The arm or medium changer moves the tapes 352 within the tape library 350, e.g., from the slots to the tape drives 351, or vice versa. One or more media agents 314 from each storage operation cell may be connected to the tape library 350 so that data can be written to and read from the tapes 352.

FIG. 3 shows the tape library 350 logically partitioned into several sections A, B, and C. Sections A, B, and C may represent the data storage available on tapes associated with particular storage operation cells. For example, section A can represent the tape storage allocated to storage operation cell 301. Section B can represent the tape storage allocated to storage operation cell 302, and section C can represent the tape storage allocated to storage operation cell 303. While the partitions A, B, and C are shown as contiguous portions of the library 350, in some embodiments, one or more of the partitions A, B, and C is distributed across non-contiguous portions of the library 350.

An Example Storage System for Sharing a Common Tape Library

Figure 4:
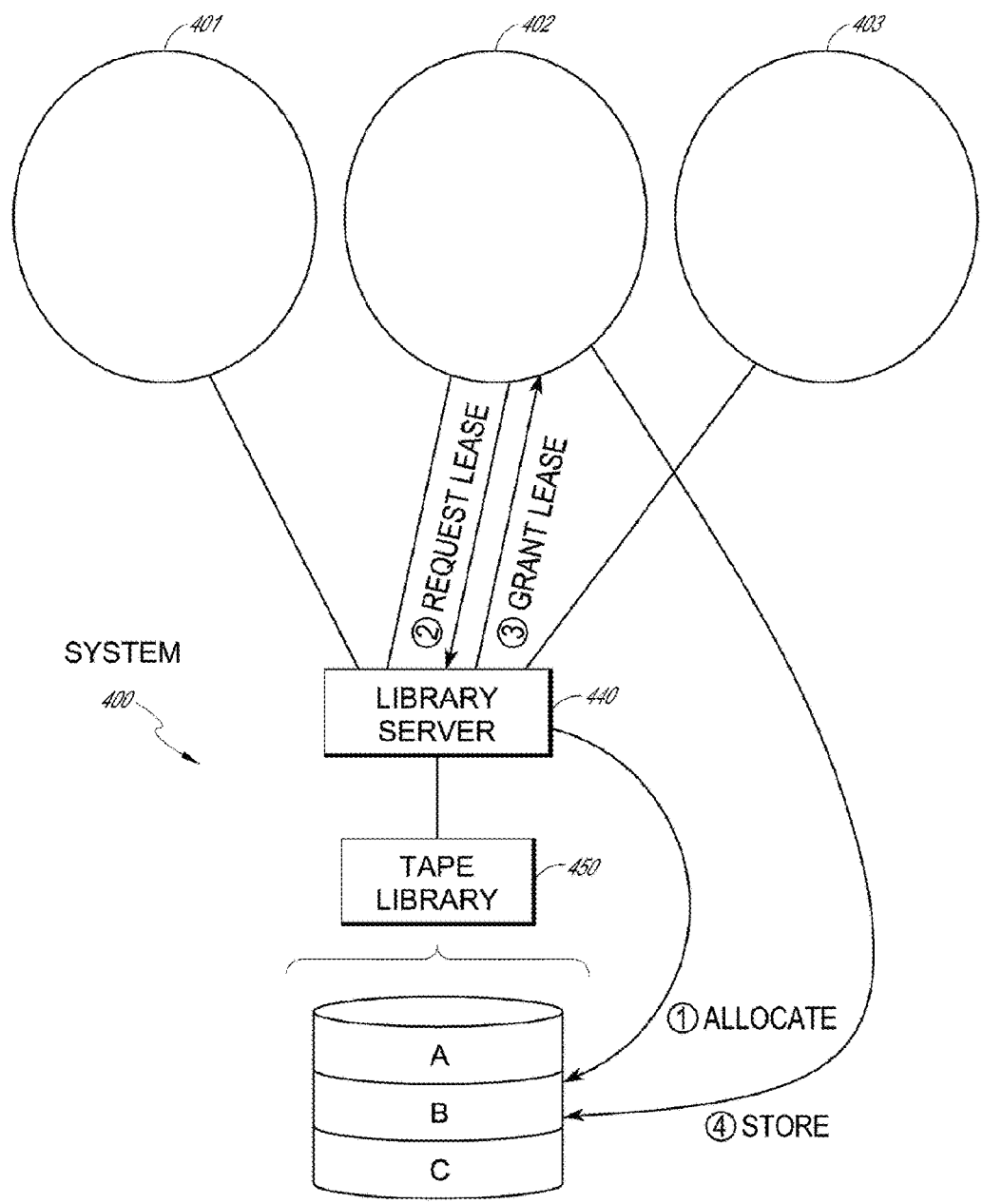
FIG. 4 is a data flow diagram illustrative of the interaction between the various components of an example storage system configured to implement sharing of a common library among multiple storage operation cells according to certain embodiments.

FIG. 4 is a data flow diagram illustrative of the interaction between the various components of an example storage system 400 configured to implement techniques for sharing a common tape library among multiple storage operation cells according to certain embodiments. As illustrated, the example storage system 400 includes storage operation cells 401, 402, and 403. The storage system 400 also includes a library server 440 and a tape library 450. The storage operation cells 401-403 can be similar to storage operation cells shown in FIGS. 2, 2A, and 3. The library server 440 and the tape library 450 can be similar to the library server 340 and the tape library 350 as illustrated in FIG. 3, respectively. Although not shown, storage operation cells 401, 402, and 403 may each include one or more of the following components, as described in connection with FIGS. 2, 2A, and 3: a data agent, a client, an information store, a storage manager, a media agent, and a storage device. All components of storage operation cells 401-403 can be in direct communication with each other or communicate indirectly via the client, the storage manager, the media agent, or the like. In certain embodiments, some of the components in FIG. 3 shown as separate components can reside on a single computing device.

With further reference to FIG. 4, example interaction between the various components of the example storage system 400 will now be described in greater detail with respect to data flow steps indicated by the numbered arrows.

At data flow step 1, the library server 440 allocates the storage resources in the library according to a pre-determined allocation scheme. The allocation scheme may allocate a subset of the storage space in the library to a particular storage operation cell. For instance, where the library 450 is a tape library comprising discrete tape drives and tapes, a different set of individual tapes from the tape library 450 is allocated to each of the different storage operation cells 401, 402, and 403. The tapes are placed in physical slots within the tape library 450, and a different set of slots can be allocated to each of the different storage operation cells 401, 402, and 403. For example, the tapes allocated to a storage operation cell 401, 402, 403 can be placed in the slots that are allocated to that storage operation cell 401, 402, 403. If necessary, a different set of tape drives may also be assigned to each of the different storage operation cells 401, 402, and 403.

Tapes can be allocated in various ways. In one embodiment, tapes each have assigned barcodes (e.g., 1-500), and tapes are allocated to different cells by barcode range. For example, storage operation cell 401 in one embodiment is assigned tapes with barcode range of 1-100, and storage operation cell 402 is assigned barcode range of 101-200. Storage operation cell 403 is allocated barcode range of 201-300. The library server 440 may also allocate tape slots in the tape library 450 to storage operation cells 401-403. The tape slots may be numbered, and a certain range of slots could be assigned to a particular storage operation cell. For instance, slot range of 501-700 in one embodiment is assigned to storage operation cell 401, and slot range of 701-900 is assigned to storage operation cell 402. Slot range 901-1100 is allocated to storage operation cell 403. In this way, the tapes for different storage operation cells can be managed independently. Allocating dedicated tapes and/or slots for different storage operation cells in this way can minimize potential mix up or overlap of tapes. Without the separation of the tapes for different storage operation cells through allocation, the data for different cells may be stored on the same tape, making management of each storage cell's data more difficult. Separation of slots can also facilitate management of each cell's data by placing all the tapes for a storage cell in a similar physical location.

Allocation of barcode and/or slot ranges to individual storage operation cells can be accomplished in various ways. For example, the allocation information may be entered by an administrator of the library server 440. In one embodiment, the administrator may enter barcode ranges and/or slot ranges for various storage operation cells through a user interface (e.g., library server 440 GUI). Or the library server 440 may implement an automated, dynamic algorithm. Such algorithm could be based on the data requirements of the storage operation cells. For example, the library server 440 can assign appropriate barcode/slot ranges based on the data requirement information when a storage cell is added to the library server 440.

The library server 440 may also automatically manage the placement of media within the tape library 450. For instance, as discussed, the library server 440 in some embodiments allocates to each storage operation cell a particular barcode range and/or slot range based on the allocation scheme. In addition, the library server 440 may maintain a file or other data structure storing the allocation scheme and/or a list of the individual storage cells 401, 402, 403 and corresponding assigned barcode and/or slot ranges. In case new tapes are added to or imported into the tape library 450, the library server 440 reads the barcodes. The library server 440 can further access the stored indication of the current barcode range allocation, and use this information to determine, from the barcodes on the new tapes, which storage operation cell they should be assigned to. The library server 440 associates the new tapes with the storage operation cell that is assigned the barcode range to which the new tapes belong. The library server 440 can also access the stored indication of the slot range allocation and, based on this information, place the new tapes in slots within the appropriate slot range. For example, storage operation cell 403 is assigned a barcode range of 201-300 and a slot range of 901-1100, and a new tape having a barcode of 250 is added to the tape library 450. Because the barcode 250 falls within the barcode range 201-300, which is allocated to storage operation cell 403, the library server 440 allocates the new tape to storage operation cell 403. The library server 440 places the new tape in slot 950, which falls within the slot range 901-1100 assigned to storage operation cell 403.

In case tapes belonging to a particular storage operation cell are misplaced in slots allocated to another storage operation cell (e.g., due to manual placement of the tape by a person), the library server 440 recognizes the incorrect placement and automatically moves the tapes to slots belonging to the particular storage operation cell. For example, a tape having a barcode of 50 is placed in slot 975. Because the barcode 50 falls within the barcode range of 1-100, which is allocated to storage operation cell 401, this tape is incorrectly placed in a slot belonging to storage operation cell 403, which is allocated the slot range of 901-1100. Accordingly, the library server 440 moves the tape to a slot within the slot range for storage operation cell 401, e.g., 570 within the range of 501-700. In cases where a tape library is dedicated for use of one storage cell, such barcode/slot range allocation is not necessary since all the tapes and drives are used for that particular cell.

At data flow step 2, the library server 440 receives lease requests from storage operation cells like storage operation cells 401-403. In case a tape library is assigned to one storage operation cell, the storage cell can use all the tape drives in the tape library as is needed. However, when a tape library is shared amongst multiple storage operation cells, without some central management, one storage cell may end up using all the drives, leaving the other storage operation cells waiting. In order to manage the use of the tape drives by different storage operation cells, the concept of leasing the tape drives can be employed. Before a storage operation cell can access the tapes in the tape library, the storage operation cell can request a lease for the tape drives it needs. In this way, the scenario of one storage cell taking over all the drives can be prevented. In addition, having a central arbiter can reduce idleness of drives.

When a storage cell needs to access the tape library 450, it sends a request to access the tape library 450 to the library server 440. In some embodiments, the storage operation cells 401-403 are registered with the library server 440 for security purposes, e.g., so that requests from the storage operation cells 401-303 can be authenticated. The storage operation cells may or may not be able to communicate directly with each other. Various storage operation cells may belong to different organizations, and in such cases, the organizations would not want the cells to communicate with other cells. The lease requests may be sent by a media agent of a storage operation cell or by other appropriate components in the storage operation cell.

The library server 440 may maintain a queue or other data structure to manage the lease requests. The queue may be a priority queue. In one example, the tape library 450 has 100 drives. Storage operation cell 401 requests to use 75 drives to perform a backup or other operation, and storage operation cell 402 subsequently requests to use 60 drives. Because the request from storage operation cell 401 was received first, the library server 440 grants storage operation cell 401 the lease to use 75 drives. Because there are only 100 total drives, the lease request from storage operation cell 402 will be queued while storage operation cell 401 is using the 75 drives. In other embodiments, the library server 440 grants storage operation cell 402 a lease to use the available 25 drives, and a request to lease the remaining 35 requested drives is placed in the queue.

A lease request may include a variety of information. For example, a lease request can include, without limitation, the identity of the storage operation cell making the request, the number of drives requested, the estimated duration of the lease, a requested time of completion, and priority information relating to the request. The lease request can also include information about a particular storage operation (or group of operations) associated with the request. For instance, the storage operation cell 401, 402, 403 may include in the request a type of storage operation (e.g., backup, restore, etc.), an amount of data involved in the request, a file system volume, a file, or other data type involved in the request, etc.

In one embodiment, the number of drives that can be requested by a storage operation cell is capped at a maximum. This prevents one storage operation cell from using all the drives. In one embodiment, the storage operation cell does not directly include the number of drives in the request, and the library server 440 instead derives the number of drives involved in the request based on some other information provided in the request (e.g., the amount of data involved in the request, the identity of a file system volume, directory, file, or other type of data being requested, etc.).

The estimation duration of the lease can indicate the amount of time the storage operation cell wants to or expects to use the drives. The storage operation cell 401 may include the estimated amount of time in the request. Alternatively, the library server 440 may derive the estimated duration of the request based on information in the request, such as amount of data involved.

A lease request may include priority information. For example, the storage cell 401 may assign a priority to the request (e.g., "low", "medium", "high"), or may include an indication as to a maximum amount of time for completing the request. The library server 440 can also derive priority information from the request. For example, the library server 440 may maintain a policy assigning priorities to different types of storage operations. In one embodiment, a request to retrieve information from the tapes takes precedence over a request to write data to the tapes. Requests with higher priority may be moved to the front of the queue. The library server 440 may also assign relative priorities based on the requesting storage operation cell. For instance, a first storage cell 401 may be an information management system for a highly critical research and development site of an organization, which generates highly important production data. A second storage cell 402, on the other hand, may be an information management system for a quality assurance site, which generates relatively less important production data. In this case, the first storage cell 401 would be assigned a higher priority than the second storage cell 402.

As mentioned above, the lease-based model for sharing a common tape library can incorporate the concept of priority. Priority can include static priority and/or dynamic priority.

Static priority can refer to priority of one storage operation cell over another storage operation cell. For instance, storage operation cell 401 can have static priority over storage operation cell 402, and lease requests from storage operation cell 401 will have priority over lease requests from storage operation cell 402. Static priority can be set when storage operation cells are configured. Dynamic priority can refer to priority of a particular lease request over another lease request. Dynamic priority may be determined when the library server is processing lease requests in the queue. Dynamic priority may depend on the type of data, type of data operation, and/or any other relevant factors. For instance, lease requests for retrieving data may have higher priority than lease requests for backup operations. Data operations can include various types of storage operations, such as, for example, backup, migration, snapshots, replication operations, and the like, which are described in detail at the end of the disclosure.

Both static priority and dynamic priority may be considered in determining the priority of a lease request. In one embodiment, priority of a lease request could be a weighted combination of static priority and dynamic priority. Based on the priority information of the request, the library server 440 determines whether to place the request at the front of the queue or at the back of the queue. In some embodiments, only static priority is considered to determine the priority of a lease request. In others embodiments, only dynamic priority is considered.

At data flow step 3, the library server 440 grants or rejects a lease request. If a lease request is granted, the storage operation cell that is granted the lease becomes the owner of the assigned drives for the lease period. The storage operation cell can use the drives assigned to it for the designated amount of time. In one embodiment, the granted lease request includes the identifiers for the tape drives that are assigned to the storage operation cell and includes the duration of the lease. The duration of the lease may be indicated by timestamps, e.g., start time and end time.

The library server 440 may alternatively reject the lease request at data flow step 3. For instance, the lease request may be rejected if it does not contain all required information or if any of the information is incorrect. If a lease request cannot be processed at that time, e.g., because the requested number of drives is not available, the request may be placed back in the queue to be processed at a later time.

In one embodiment, the library server 440 is configured to reduce idleness of tape drives. For instance, if there are idle and available tape drives at any given time, storage operation cells who have requested a lease should be given access to those drives. Drive idleness may occur, for example, where a storage operation cell is not using the assigned drives although the lease period has not yet expired.

When the lease expires, i.e., end of the lease duration is reached, the library server 440 may send an inquiry to the storage operation cell to determine whether it is still using the drives assigned in the lease. If the storage operation cell is no longer using the drives, the drives are released, and the library server 440 can lease them in response to other requests. The storage operation cell may send an acknowledgement (ack) in response to the inquiry from the library server 440. The ack may indicate that the storage operation is still using the drives or no longer using the drives. In this manner, the library server 440 allows data operations do not end abruptly, before completion. The library server 440 may also send such an inquiry prior to expiration of the lease, e.g., to determine whether the storage operation cell is actually using the assigned drives. If the drives are no longer being used for any reason, they can be freed up for other lease requests, e.g., lease requests from a different storage operation cell. In other embodiments, the library server 440 may monitor drive usage instead of sending inquiries to the storage operation cells.

If the storage operation cell wants to use the drives beyond the duration of the original lease, the storage operation cell can extend the lease. The storage operation cell may extend the lease at or near the point of expiration of the lease, e.g., when the library server 440 sends the inquiry asking whether the storage operation cell is still using the drives. Alternatively, the storage operation cell may extend the lease before the expiration of the lease by sending a lease renewal or extension request to the library server 440. The number of extensions may be capped so that a storage operation cell cannot continuously extend its lease and use all available tape drives. In this manner, the library server 440 can adopt periodic or incremental extensions of lease, which facilitates minimizing drive idleness.

The library server 440 can also offer an interrupt feature. For instance, the library server 440 may receive a lease request with higher priority than existing leases, but all drives could be in use at that time. In such cases, the library server 440 may offer the option to interrupt the current leases in order to accommodate the lease request having a higher priority. In some cases, already granted leases can be temporarily rescinded in favor of a subsequently received higher priority lease. For instance, if an incoming lease request from a first storage operation cell has a higher priority than an active lease associated with a second storage operation cell, the library server 440 may interrupt the existing active lease by temporarily withdrawing access to the drives by the second storage operation cell and granting access to the drives to the first storage operation cell. The interrupt function can be considered to be a subset of priority. That is, lease requests with a certain level of priority may have the option to interrupt other leases.

At data flow step 4, the storage operation cell stores data to the tape library 450 using the drives that have been assigned to it. In one embodiment, the storage operation cell writes data via one or more media agents belonging to the storage operation cell. The data is written to the tapes that are allocated to the storage operation cell. As explained above, the tapes for a particular storage operation cell may be assigned by barcode range. Although the data operation involving the tape library has been explained in terms of storing or writing data to tapes, it is not limited to such and can include other types of data operations, such as reading data from tapes. In addition, although described in relation to backup operations for the purposes of illustration, data operations discussed with respect to FIG. 4 can be compatible with other types of storage operations, such as, for example, archive, migration, snapshots, replication operations, and the like. Examples of some of these operations are provided toward the end of the disclosure.

Similar to FIG. 3, FIG. 4 shows the tape library 450 logically partitioned into several sections A, B, and C. Sections A, B, and C may each represent data storage available on tapes associated with a particular storage operation cell. For example, section A can represent the tape storage available to storage operation cell 401. Section B can represent the tape storage available to storage operation cell 402, and section C can represent the tape storage available to storage operation cell 403.

While described primarily in the context of using a shared tape library, certain concepts described herein, such as the leasing schemes and associated priority algorithms described with respect to FIGS. 4-7, are compatible with other types of storage technology, including, for example, a set of hard drives, solid-state drives, solid-state storage, optical storage, virtual tape library (VTL), etc. A virtual tape library is a data storage virtualization technology that can be used, for example, for backup and recovery and may present a storage component (usually hard disk storage) as tape libraries or tape drives for use with existing storage operation software.

Figure 5:
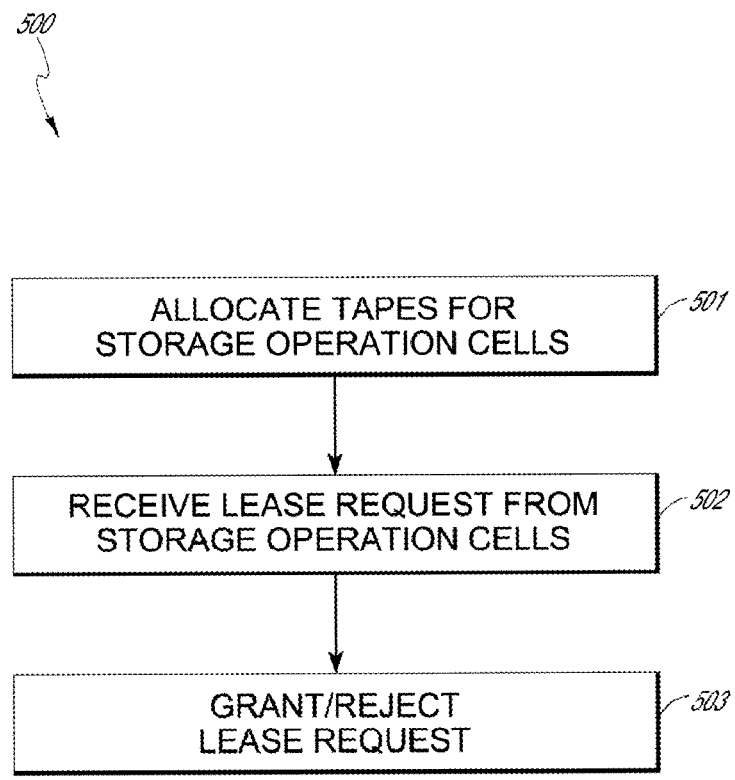
FIG. 5 is a flow diagram illustrative of one embodiment of a routine for sharing a common library among multiple storage operation cells in a storage system.

FIG. 5 is a flow diagram illustrative of one embodiment of a routine for sharing a common tape library among multiple storage operation cells in a storage system. The routine 500 is described with respect to the system 400 of FIG. 4. However, one or more of the steps of routine 500 may be implemented by other storage systems, such as those described in greater detail above with reference to FIGS. 2, 2A, and 3. The routine 500 can be implemented by any one, or a combination of, a client, a storage manager, a data agent, a media agent, and the like. Moreover, further details regarding certain aspects of at least some of steps of the routine 500 are described in greater detail above with reference to FIG. 4. Although described in relation to backup operations for the purposes of illustration, the process of FIG. 5 can be compatible with other types of storage operations, such as, for example, migration, snapshots, replication operations, and the like.

At block 501, the library server 440 allocates tapes for each storage operation cell 401-403. The allocation of tapes can be by barcode range of tapes. The library server 440 may also allocate slots within the tape library 450 to each storage operation cell 401-403. Slots can be allocated by slot range. Allocating particular tapes and slots to different storage operation cells can allow the library server 440 to automatically manage the positioning and physical placement of the tapes in the appropriate locations within the tape library 450. For example, if a tape allocated to a storage operation cell is placed in a slot that is assigned to a different storage operation cell, the library server 440 automatically detects the misplacement and moves the tape to a slot within the slot range assigned to that storage operation cell.

At block 502, the library server 440 receives a lease request from a storage operation cell. The lease request can include a variety of information, such as number of drives, estimated duration of the lease, and priority information relating to the request. The number of drives a storage operation cell can request may have a specified maximum so that one storage operation cell cannot use all of the tape drives.

At block 503, the library server 440 grants or rejects a lease request from a storage operation cell. The lease request may be rejected if it does not contain sufficient information or if any information is incorrect. If a lease request cannot be processed at that time, e.g., because the requested number of drives is not available, the request may be placed back in the queue to be processed at a later time. Granting or rejecting a lease request is explained in more detail with respect to FIG. 6 below.

The routine 500 can include fewer, more, or different blocks than those illustrated in FIG. 5 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 6:
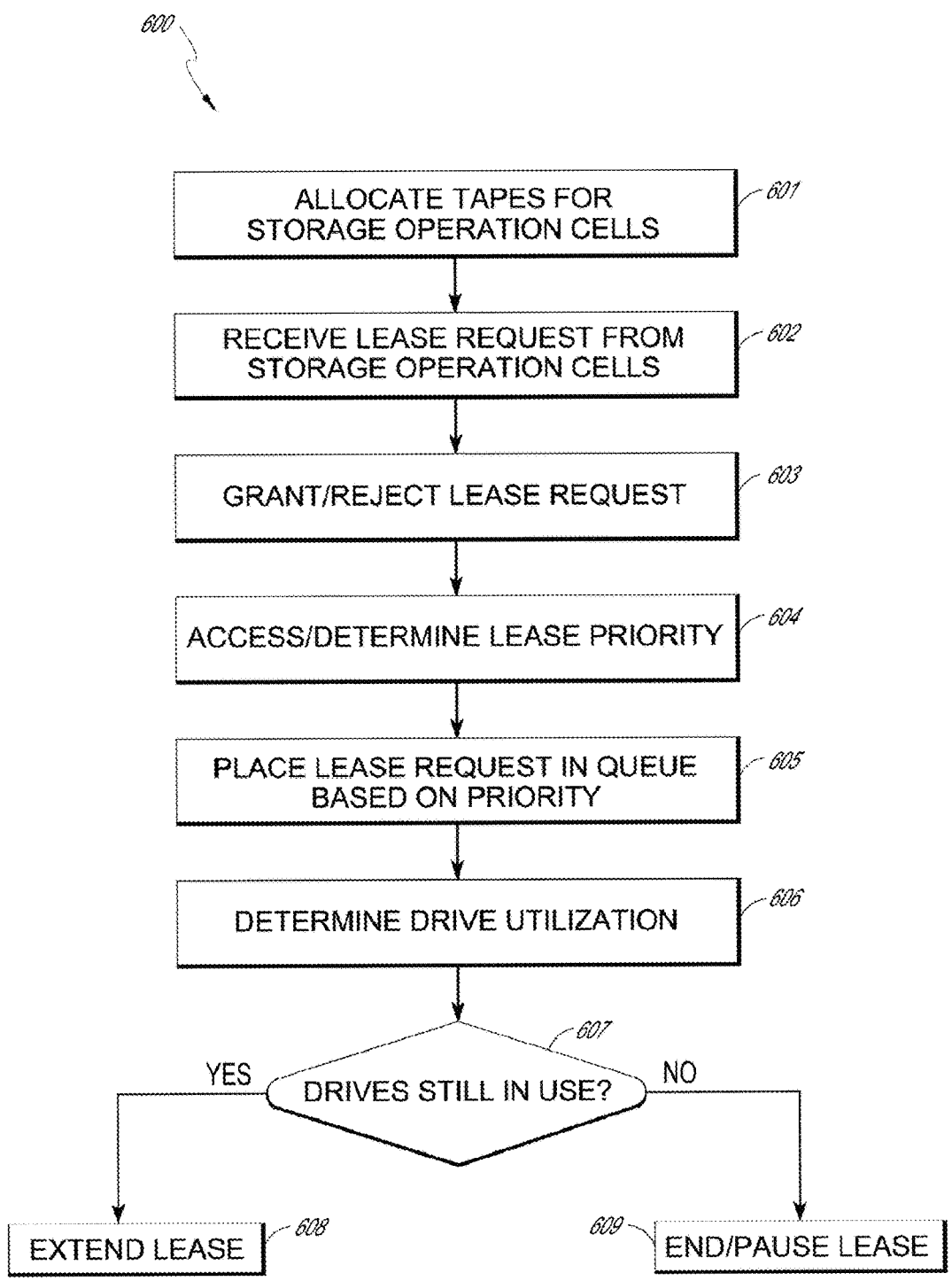
FIG. 6 is a flow diagram illustrative of one embodiment of a routine for sharing a common library among multiple storage operation cells in a storage system.

FIG. 6 is a flow diagram illustrative of one embodiment of a routine for sharing a common tape library among multiple storage operation cells in a storage system. The routine 600 is described with respect to the system 400 of FIG. 4. However, one or more of the steps of routine 600 may be implemented by other storage systems, such as those described in greater detail above with reference to FIGS. 2, 2A, and 3. The routine 600 can be implemented by any one, or a combination of, a client, a storage manager, a data agent, a media agent, and the like. Moreover, further details regarding certain aspects of at least some of steps of the routine 600 are described in greater detail above with reference to FIG. 4. Although described in relation to backup operations for the purposes of illustration, the process of FIG. 6 can be compatible with other types of storage operations, such as, for example, migration, snapshots, replication operations, and the like.

At block 601, the library server 440 allocates tapes for storage operation cells 401-403. As explained above with respect to FIG. 5, tapes can be allocated by barcode ranges. The slots within the tape library 450 may also be allocated to storage operation cells 401-403. By partitioning the tapes and the slots for different storage operation cells, the library server 440 can manage the positioning or placement of the tapes in the tape library 450.

At block 602, the library server 440 receives a lease request from a storage operation cell. As explained above with respect to FIG. 5, the lease request can include the number of drives, the estimated duration of the lease, and priority information relating to the request.

At block 603, the library server 440 either grants or rejects the lease request when the lease request is to be processed. As explained above with respect to FIG. 5, the lease request may be rejected if it does not contain sufficient information or if any information is incorrect. If a lease request cannot be processed at that time, e.g., because the requested number of drives is not available, the request may be placed back in the queue to be processed at a later time. If the lease request has a high priority and the library server 440 offers the interrupt option, the existing leases can be interrupted to process the high priority request. If the lease is granted, the requesting storage operation cell becomes the owner of the assigned drives for the duration of the lease. The storage operation cell can use the drives as desired, e.g., to write data to the tapes.

At block 604, the library server 440 accesses or determines lease priority, e.g., by referring to the information included in the request. At block 605, the library server 440 places the lease request in the queue based on the priority. For example, if the request has a relatively high priority, the library server 440 may place the lease request at front of the queue or towards the front of the queue. On the other hand, if the request does not have a relatively high priority, the library server 440 may place the lease request at the back of the queue or towards the back of the queue. Priority can include static priority and dynamic priority. Static priority may refer to priority given to a storage operation cell over another storage operation cell. Dynamic priority may refer to priority given to a lease request over another lease request. Priority may be determined based on static priority, dynamic priority, or both. In one embodiment, priority may be a weighted combination of static priority and dynamic priority.

At block 606, the library server 440 determines drive utilization. In one embodiment, the library server 440 monitors drive usage. In another embodiment, the library server 440 sends an inquiry to the storage operation cell at the expiration of the lease to check whether the storage operation cell is still using the assigned drives. In response, the storage operation cell may send an acknowledgement that it is still using the drives. The ack can also include a request to renew or extend the lease. If the drives are still in use (e.g., a renewal or extension request is received), as shown in block 608, the library server 440 extends the lease as appropriate, as shown in block 609. If the drives are not in use at block 608, the library server 440 ends or pauses the lease so that the drives can be used for other requests. Either block 608 or 609, or both may be implemented depending on the embodiment. This process of renewing leases may be referred to as incremental or periodic extension. By incorporating the concept of incremental or periodic extension, the library server 440 can minimize the idleness of drives by continuing to check whether leased out drives are in actual use.

The routine 600 can include fewer, more, or different blocks than those illustrated in FIG. 6 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figures 1, 2A:
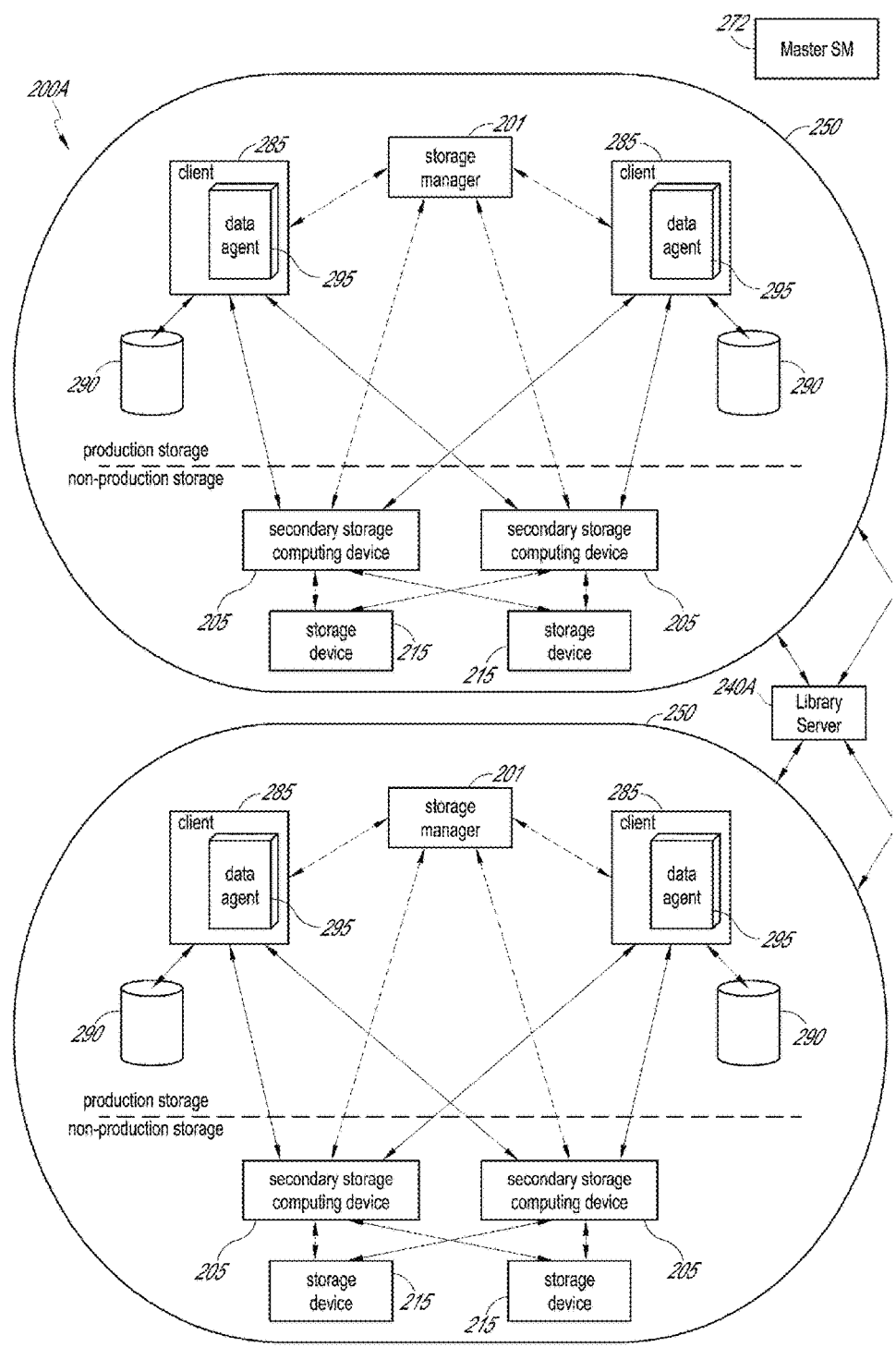
Figures 2, 2A:
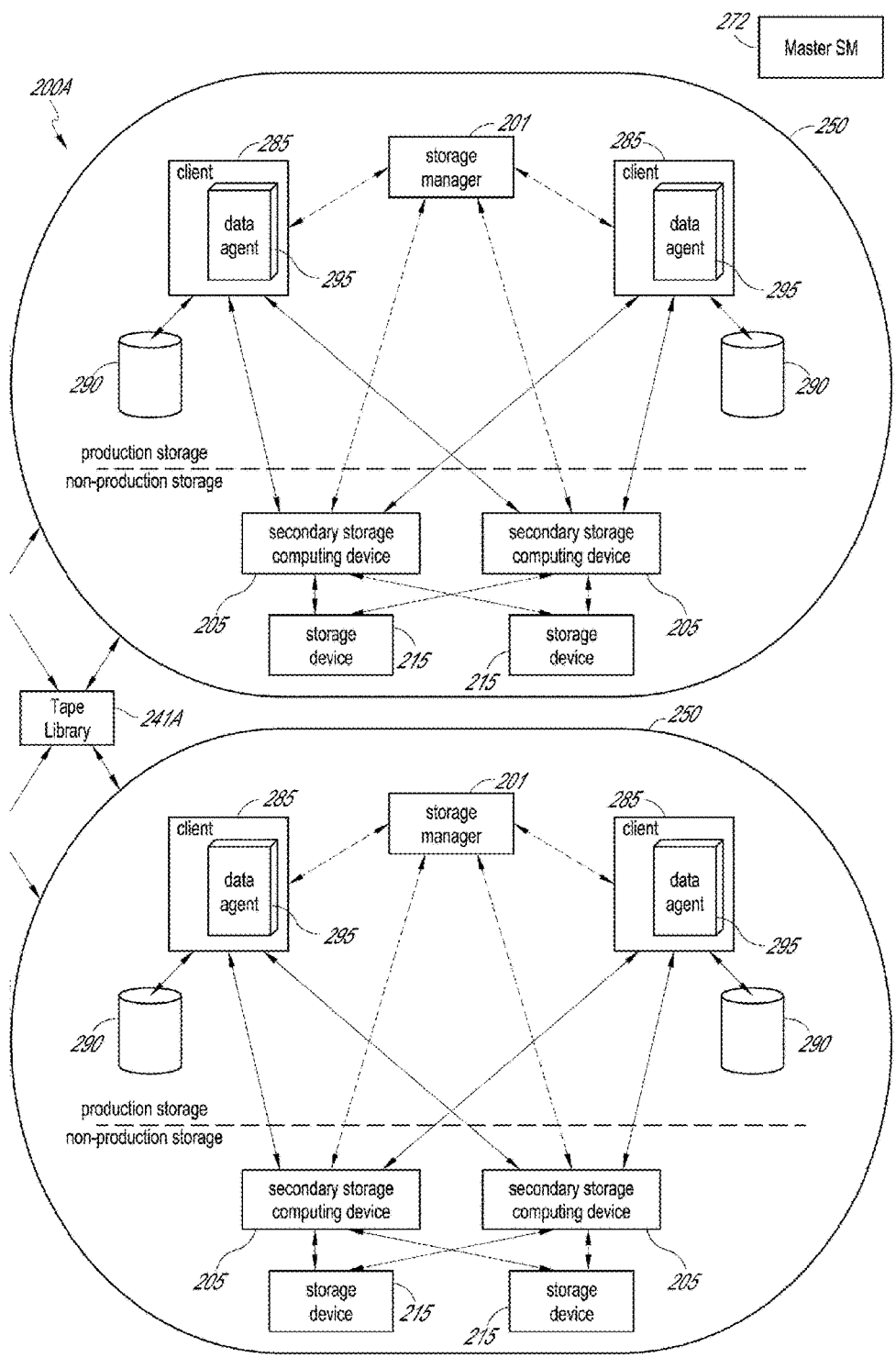
Figure 7:
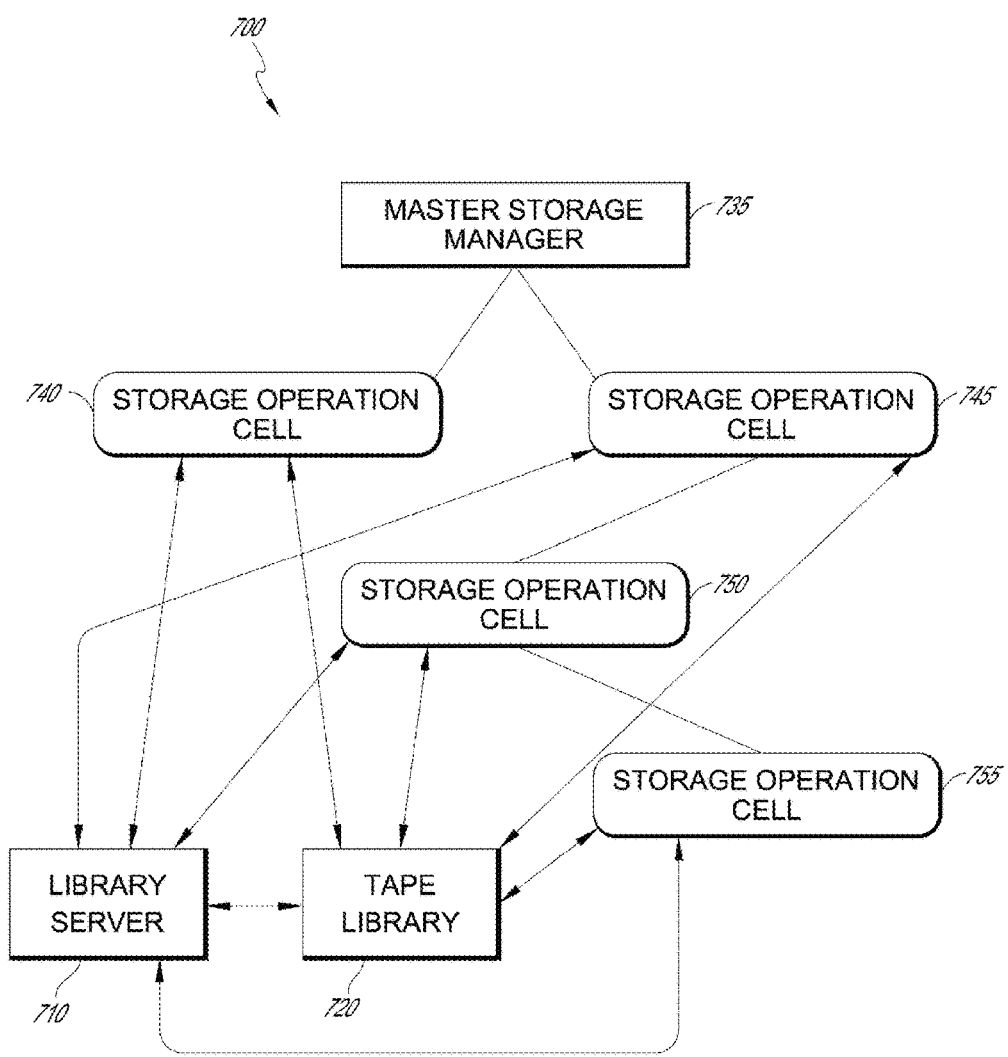
FIG. 7 is a generalized block diagram of a hierarchically organized group of storage operation cells according to certain embodiments.

FIG. 7 is a block diagram of a hierarchically organized group of storage operation cells according to certain embodiments. It will be understood that although the storage operation cells generally depicted in FIG. 7 have different reference numbers than the storage operation cell 250 shown in FIG. 2, these cells may be configured the same as or similar to the storage cell 250 as depicted in FIG. 2. The group of storage operation cells may share a library server 710 and a tape library 720, which are similar to the library server 240A, 340, 440 and the tape library 241A, 350, 450 explained with respect to FIGS. 2A-1 and 2A-2.

As shown, the system illustrated in FIG. 7 may include a master storage manager component 735 and various other storage operations cells. As shown, the illustrative embodiment in FIG. 7 includes a first storage operation cell 740, a second storage operation cell 745, a third storage operation cell 750, a fourth storage operation cell 755, and may be extended to include nth storage operation cell, if desired (not shown). However, it will be understood this illustration is only exemplary and that fewer or more storage operation cells may be present or interconnected differently if desired.

Storage operation cells, such as the ones shown in FIG. 7 may be communicatively coupled and hierarchically organized. For example, a master storage manager 735 may be associated with, communicate with, and direct storage operations for a first storage operation cell 740, a second storage operation cell 745, a third storage operation cell 750, and fourth storage operation cell 755. In some embodiments, the master storage manager 735 may not be part of any particular storage operation cell. In other embodiments (not shown), master storage manager 735 may itself be part of a certain storage operation cell. This logical organization provides a framework in which data objects, metadata and other management data may be hierarchically organized and associated with appropriate devices components (e.g., storage devices).

The storage operation cells may be configured in any suitable fashion. Thus, in operation, master storage manager 735 may communicate with a management agent of the storage manager of the first storage operation cell 740 (or directly with the other components of first cell 740) with respect to storage operations performed in the first storage operation cell 740. For example, in some embodiments, master storage manager 735 may instruct the first storage operation cell 740 with certain commands regarding a desired storage operation such as how and when to perform particular storage operations including the type of operation and the data on which to perform the operation.

In other embodiments, master storage manager 735 may track the status of its associated storage operation cells, such as the status of jobs, system components, system resources, and other items, by communicating with manager agents (or other components) in the respective storage operation cells. Moreover, master storage manager 735 may track the status of its associated storage operation cells by receiving periodic status updates from the manager agents (or other components) in the respective cells regarding jobs, system components, system resources, and other items. For example, master storage manager 735 may use methods to monitor network resources such as mapping network pathways and topologies to, among other things, physically monitor storage operations and suggest, for example, alternate routes for storing data as further described herein.

In some embodiments, master storage manager 735 may store status information and other information regarding its associated storage operation cells and other system information in an index cache, database or other data structure accessible to manager 735. A presentation interface included in certain embodiments of master storage manager 735 may access this information and present it to users and system processes with information regarding the status of storage operations, storage operation cells, system components, and other information of the system.

In some embodiments, master storage manager 735 may store and/or track metadata and other information regarding its associated storage operation cells and other system information in an index cache, database or other data structure accessible to manager 735. Thus, during a search procedure as further described herein, queries can be directed to a specific storage operation cell or cells based on the cellos function, past involvement, routing or other information maintained within the storage manager or other management component.

As mentioned above, storage operation cells may be organized hierarchically. With this configuration, storage operation cells may inherit properties from hierarchically superior storage operation cells or be controlled by other storage operation cells in the hierarchy (automatically or otherwise). Thus, in the embodiment shown in FIG. 7, storage operation cell 745 may control or is otherwise hierarchically superior to storage operation cells 750 and 755. Similarly, storage operation cell 750 may control storage operation cells 755. Alternatively, in some embodiments, storage operation cells may inherit or otherwise be associated with storage policies, storage preferences, storage metrics, or other properties or characteristics according to their relative position in a hierarchy of storage operation cells.

Storage operation cells may also be organized hierarchically according to function, geography, architectural considerations, or other factors useful or desirable in performing storage operations. For example, in one embodiment, storage operation cell 740 may be directed to create snapshot copies of primary copy data, storage operation cell 745 may be directed to create backup copies of primary copy data or other data. Storage operation cell 740 may represent a geographic segment of an enterprise, such as a Chicago office, and storage operation cell 745 may represents a different geographic segment, such as a New York office. In this example, the second storage operation cells 745, 750 and 755 may represent departments within the New York office. Alternatively, these storage operation cells could be further divided by function performing various types of copies for the New York office or load balancing storage operations for the New York office.

As another example, and as previously described herein, different storage operation cells directed to different functions may also contain the same or a subset of the same set of physical devices. Thus, one storage operation cell in accordance with the principles of the present disclosure may be configured to perform SRM operations and may contain the same, similar or a subset of the same physical devices as a cell configured to perform HSM or other types of storage operations. Each storage operation cell may, however, share the same parent or, alternatively, may be located on different branches of a storage operation cell hierarchy tree. For example, storage operation cell 745 may be directed to SRM operations whereas storage operation cell 755 may be directed to HSM operations. Those skilled in the art will recognize that a wide variety of such combinations and arrangements of storage operation cells are possible to address a broad range of different aspects of performing storage operations in a hierarchy of storage operation cells.

In some embodiments, hierarchical organization of storage operation cells facilitates, among other things, system security and other considerations. For example, in some embodiments, only authorized users may be allowed to access or control certain storage operation cells. For example, a network administrator for an enterprise may have access to many or all storage operation cells including master storage manager 735. But a network administrator for only the New York office, according to a previous example, may only have access to storage operation cells 745-755, which form the New York office storage management system.

Moreover, queries performed by the system may be subject to similar restrictions. For example, depending on access privileges, users may be limited or otherwise excluded from searching a certain cell or cells. For example, a user may be limited to searching information in cells within the system that are unrestricted or to those which specific access rights have been granted. For example, certain users may not have privileges to all information within the system. Accordingly, in some embodiments, as a default setting, users may have access privileges to information in cells that they interact with. Thus, confidential and sensitive information may be selectively restricted except only to certain users with express privileges (e.g., financial or legal information).

Other restrictions on search criteria may include the scope of the search. For example, in a large network with many storage cells may require dedicating significant amounts of resources to perform go global or comprehensive searches. Thus, if a certain resource threshold is exceeded by a proposed search, the system may prompt that search to be modified or otherwise cancelled.

In other embodiments master storage manager 735 may alert a user such as a system administrator when a particular resource is unavailable or congested. For example, a particular storage device might be full or require additional media. For example, a master storage manager may use information from an HSM storage operation cell and an SRM storage operation cell to present indicia or otherwise alert a user or otherwise identify aspects of storage associated with the storage management system and hierarchy of storage operation cells.

Alternatively, a storage manager in a particular storage operation cell may be unavailable due to hardware failure, software problems, or other reasons. In some embodiments, master storage manager 735 (or another storage manager within the hierarchy of storage operation cells) may utilize the global data regarding its associated storage operation cells to suggest solutions to such problems when they occur (or act as a warning prior to occurrence). For example, master storage manager 735 may alert the user that a storage device in a particular storage operation cell is full or otherwise congested, and then suggest, based on job and data storage information contained in its database or an alternate storage device. Other types of corrective actions based an such information may include suggesting an alternate data path to a particular storage device, or dividing data to be stored among various available storage devices as a load balancing measure or to otherwise optimize storage or retrieval time. In some embodiments, such suggestions or corrective actions may be performed automatically, if desired. This may include automatically monitoring the relative health or status of various storage operation cells and searching for information within the cells of the system relating to systems or resource performance within that cell (e.g., index, database, or the like) for use in diagnostics or for suggesting corrective action.

In certain embodiments, HSM and SRM components may be aware of each other due to a common database of information that may include normalized data from a plurality of cells. Therefore, in those embodiments there is no need for such information to pass through a master storage manager as these components may be able to communicate directly with one another. For example, storage operation cell 745 may communicate directly with storage operation cell 755 and vice versa. This may be accomplished through a direct communications link between the two or by passing data through intermediate cells.

Moreover, in some embodiments searches may be performed across a numerous storage cells within the hierarchy. For example, a query may be posed to master storage manager 735 that may pass the query down through the hierarchy from cells 740 to 745 to 750 and 755. This may be accomplished by passing the query form one manager component of each cell to another, or from one data classification agent to another. The results may be passed upward through the hierarchy and compiled with other results such that master storage manager 735 has a complete set of results to report. In other embodiments, each storage manager cell may report results directly to the requestor or to a designated location.

Storage operations compatible with embodiments described herein will now be described. For example, data can be stored in primary storage (e.g., production storage) as a primary copy (e.g., production data) or in secondary storage (e.g., non-production storage) as various types of secondary copies (e.g., non-production data) including, as a backup copy, a snapshot copy, a hierarchical storage management copy ("HSM"), an archive copy, and other types of copies. Certain embodiments described herein with respect to backup operations are similarly compatible with each of these types of operations.

A primary copy of data according to some embodiments is a production copy or other "live" version of the data which is used by a software application and is generally in the native format of that application. Such primary copy data is typically intended for short term retention (e.g., several hours or days) before some or all of the data is stored as one or more secondary copies, such as, for example, to prevent loss of data in the event a problem occurred with the data stored in primary storage.

Secondary copies can include point-in-time data and are typically intended for long-term retention (e.g., weeks, months or years) before some or all of the data is moved to other storage or is discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy in some embodiments is a copy of production data and, in some embodiments, can be stored in a backup format, e.g., as opposed to a native application format. For example, a backup copy may be stored in a backup format that facilitates compression and/or efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, in some embodiments, a snapshot may be thought of as an instant image of the primary copy data at a given point in time. A snapshot generally captures the directory structure of a primary copy volume at a particular moment in time and may also preserve file attributes and contents. In some embodiments, a snapshot may exist as a virtual file system, parallel to the actual file system. Users typically gain read-only access to the record of files and directories of the snapshot. By electing to restore primary copy data from a snapshot taken at a given point in time, users may also return the current file system to the state of the file system that existed when the snapshot was taken.

A snapshot in some cases is created substantially instantly, using a minimum amount of file space, but may still function as a conventional file system backup. Some types of snapshots do not actually create another physical copy of all the data, but may simply create pointers that are able to map files and directories to specific disk blocks.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage. The snapshot mapping of file system data is also updated to reflect the changed block(s) at that particular point in time.

An HSM copy can be a copy of the primary copy data but typically includes only a subset of the primary copy data that meets a certain criteria and is usually stored in a format other than the native application format. For example, an HSM copy may include data from the primary copy that is larger than a given size threshold or older than a given age threshold and that is stored in a backup format. Often, HSM data is removed from the primary copy, and a stub is stored in the primary copy to indicate the new location of the HSM data. When a user requests access to the HSM data that has been removed or migrated, systems use the stub to locate the data and often make recovery of the data appear transparent, even though the HSM data may be stored at a location different from the remaining primary copy data.

An archive copy according to some embodiments is generally similar to an HSM copy. However, the data satisfying criteria for removal from the primary copy is generally completely removed with no stub left in the primary copy to indicate the new location (i.e., where the archive copy data has been moved to). Archive copies of data are sometimes stored in a backup format or other non-native application format. In addition, archive copies are generally retained for very long periods of time (e.g., years) and, in some cases, are never deleted. In certain embodiments, such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Similar data transfers associated with location-specific criteria are performed when restoring data from secondary storage to primary storage. For example, to restore data a user or system process generally must specify a particular secondary storage device, piece of media, or archive file. Thus, the precision with which conventional storage management systems perform storage operations on electronic data is generally limited by the ability to define or specify storage operations based on data location.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of administering access to a tape data storage library that is shared amongst a plurality of data storage cells to manage copies of primary data, the method comprising:
using one or more computing devices comprising computer hardware:
assigning, for each respective data storage cell of a plurality of data storage cells, a subset of a plurality of tapes in a tape data storage library for use by the respective data storage cell the tape data storage library residing in a secondary storage subsystem and including a plurality of tape drives and a plurality of tape slots configured to hold the plurality of tapes, wherein access to the tape data storage library is shared by the data storage cells and each of the data storage cells comprises one or more client computing devices residing in a primary storage subsystem;
receiving from a first data storage cell of the plurality of data storage cells a first tape drive lease request to lease one or more tape drives for accessing the subset of tapes assigned to the first data storage cell to perform a first storage operation, the first storage operation associated with moving data between the primary storage subsystem and the tape data storage library, the first tape drive lease request including priority information associated with the first tape drive lease request;
determining a first priority level of the first tape drive lease request based on a combination of data-storage-cell-specific priority based on a first type of data that the first data storage cell is configured to generate, and lease-request-specific priority based on (i) a type of the data to be moved between the primary storage subsystem and the tape data storage library using the one or more tape drives to be leased, and (ii) a type of the first storage operation to be performed using the one or more tape drives to be leased such that tape drive lease requests to lease tape drives for retrieving data from the tape data storage library are prioritized over tape drive lease requests to lease tape drives for writing data to the tape data storage library;
receiving from a second data storage cell of the plurality of data storage cells a second tape drive lease request to lease one or more tape drives for accessing the subset of tapes assigned to the second data storage cell to perform a second storage operation, the second storage operation associated with moving data between the primary storage subsystem and the tape data storage library, the second tape drive lease request including priority information associated with the second tape drive lease request;
determining a second priority level of the second tape drive lease request based on a combination of data-storage-cell-specific priority based on a second type of data that the second data storage cell is configured to generate, and lease-request-specific priority based on (i) a type of the data to be moved between the primary storage subsystem and the tape data storage library using the one or more tape drives to be leased, and (ii) a type of the second storage operation to be performed using the one or more tape drives to be leased such that tape drive lease requests to lease tape drives for retrieving data from the tape data storage library are prioritized over tape drive lease requests to lease tape drives for writing data to the tape data storage library, wherein the second type of data that the second data storage cell is configured to generate is different from the first type of data that the first data storage cell is configured to generate;

in response to determining that the first priority level is higher than the second priority level, placing the first and second tape drive lease requests in a queue such that the first tape drive lease request is ahead of the second tape drive lease request in the queue; and granting a first lease of one or more tape drives of the plurality of tape drives to the first data storage cell for providing temporary access to the subset of tapes assigned to the first data storage cell, the first lease associated with a lease duration for which access to the one or more tape drives is to be granted to the first data storage cell under the first lease.

2. The method of claim 1, further comprising:

determining, prior to expiration of the lease duration associated with the first lease, that the first data storage cell is still using the one or more tape drives; and in response to the determination that the first data storage cell is still using the one or more tape drives, extending the first lease of the one or more tape drives assigned to the first data storage cell.

3. The method of claim 1, further comprising:

receiving from a third data storage cell of the plurality of data storage cells a third request to access the subset of tapes assigned to the third data storage cell for performing a third storage operation, the third storage operation to move data between the primary storage subsystem and the tape data storage library, the third request including priority information associated with the third request; and in response to determining that the third request has a higher priority than the first request, interrupting the first lease of the one or more tape drives granted to the first data storage cell such that access to the one or more tape drives is withdrawn from the first data storage cell and granted to the third data storage cell.

4. The method of claim 1, wherein the subset of tapes for the respective data storage cell is dedicated for use by that data storage cell and not by others of the plurality of data storage cells.

5. The method of claim 1, wherein each of the first storage operation and the second storage operation comprises one or more of a retrieval operation, a backup operation, a migration operation, a snapshot operation, or a replication operation.

6. The method of claim 1, wherein the first storage operation is a data retrieval operation comprising retrieving data from the tape data storage library, and the second storage operation is a data backup operation comprising writing data to the tape data storage library, wherein the lease-request-specific priority associated with the first storage operation is higher than the lease-request-specific priority associated with the second storage operation.

7. The method of claim 1, further comprising determining that the data-storage-cell-specific priority associated with the first data storage cell is higher than the data-storage-cell-specific priority associated with the second data storage cell based on the first type of data to be generated by the first data storage cell having a higher priority than the second type of data to be generated by the second data storage cell.

8. The method of claim 1, further comprising determining the first priority level based on a weighted combination of the data-storage-cell-specific priority and the lease-request-specific priority corresponding to the first request, and determining the second priority level based on a weighted combination of the data-storage-cell-specific priority and the lease-request-specific priority corresponding to the second request.

9. The method of claim 1, wherein each tape is associated with a specific tape identifier, the method further comprising:

assigning, based on first data requirement information associated with the first data storage cell, a first range of tape identifiers to the first data storage cell such that tapes corresponding to the first range of tape identifiers are dedicated to performing operations associated with the first data storage cell; and assigning, based on second data requirement information associated with the second data storage cell, a second range of tape identifiers to the second data storage cell such that tapes corresponding to the second range of tape identifiers are dedicated to performing operations associated with the second data storage cell, wherein the first range and the second range do not overlap.

10. The method of claim 1, wherein the first tape drive lease request specifies a first number of tape drives to be leased and a first duration for which the first number of tape drives are to be leased, and the second tape drive lease request specifies a second number of tape drives to be leased and a second duration for which the second number of tape drives are to be leased, the method further comprising:

determining the first priority level further based on the first number and the first duration; and determining the second priority level further based on the second number and the second duration.

11. The method of claim 1, further comprising:

determining, prior to expiration of the lease duration associated with the first lease, that the first data storage cell is no longer using the one or more tape drives; and terminating the first lease prior to the expiration of the lease duration such that the one or more tape drives leased under the first lease become available for use by one or more other data storage cells in the plurality of data storage cells.

12. The method of claim 1, further comprising:

receiving, prior to expiration of the lease duration associated with the first lease, a lease renewal request to extend a duration of the temporary access provided to the first data storage cell beyond the lease duration for which access to the one or more tape drives is granted to the first data storage cell under the first lease; and in response to the lease renewal request, extending the duration of the temporary access provided to the first data storage cell beyond the lease duration for which access to the one or more tape drives is granted to the first data storage cell under the first lease.

13. A data storage system configured to administer access to a tape data storage library that is shared amongst a plurality of data storage cells to manage copies of primary data, comprising:

one or more computing devices comprising computer hardware and configured to:

assign, for each respective data storage cell of a plurality of data storage cells, a subset of a plurality of tapes in a tape data storage library for use by the respective data storage cell the tape data storage library residing in a secondary storage subsystem and including a plurality of tape drives and a plurality of tape slots configured to hold the plurality of tapes, wherein access to the tape data storage library is shared by the data storage cells and each of the data storage cells comprises one or more client computing devices residing in a primary storage subsystem;

receive from a first data storage cell of the plurality of data storage cells a first tape drive lease request to lease one or more tape drives for accessing the subset of tapes assigned to the first data storage cell to perform a first storage operation, the first storage operation associated with moving data between the primary storage subsystem and the tape data storage library, the first tape drive lease request including priority information associated with the first tape drive lease request;

determine a first priority level of the first tape drive lease request based on a combination of data-storage-cell-specific priority based on a first type of data that the first data storage cell is configured to generate, and lease-request-specific priority based on (i) a type of the data to be moved between the primary storage subsystem and the tape data storage library using the one or more tape drives to be leased, and (ii) a type of the first storage operation to be performed using the one or more tape drives to be leased such that tape drive lease requests to lease tape drives for retrieving data from the tape data storage library are prioritized over tape drive lease requests to lease tape drives for writing data to the tape data storage library;

receive from a second data storage cell of the plurality of data storage cells a second tape drive lease request to lease one or more tape drives for accessing the subset of tapes assigned to the second data storage cell to perform a second storage operation, the second storage operation associated with moving data between the primary storage subsystem and the tape data storage library, the second tape drive lease request including priority information associated with the second tape drive lease request;

determine a second priority level of the second tape drive lease request based on a combination of data-storage-cell-specific priority based on a second type of data that the second data storage cell is configured to generate, and lease-request-specific priority based on (i) a type of the data to be moved between the primary storage subsystem and the tape data storage library using the one or more tape drives to be leased, and (ii) a type of the second storage operation to be performed using the one or more tape drives to be leased such that tape drive lease requests to lease tape drives for retrieving data from the tape data storage library are prioritized over tape drive lease requests to lease tape drives for writing data to the tape data storage library, wherein the second type of data that the second data storage cell is configured to generate is different from the first type of data that the first data storage cell is configured to generate;

in response to determining that the first priority level is higher than the second priority level, place the first and second tape drive lease requests in a queue such that the first tape drive lease request is ahead of the second tape drive lease request in the queue; and grant a first lease of one or more tape drives of the plurality of tape drives to the first data storage cell for providing temporary access to the subset of tapes assigned to the first data storage cell, the first lease associated with a lease duration for which access to the one or more tape drives is to be granted to the first data storage cell under the first lease.

14. The system of claim 13, wherein the one or more computing devices are further configured to:
determine, prior to expiration of the lease duration associated with the first lease, that the first data storage cell is still using the one or more tape drives; and
in response to the determination that the first data storage cell is still using the one or more tape drives, extend the first lease of the one or more tape drives assigned to the first data storage cell.

15. The system of claim 13, wherein the one or more computing devices are further configured to:
receive from a third data storage cell of the plurality of data storage cells a third tape drive lease request to access the subset of tapes assigned to the third data storage cell for performing a third storage operation, the third storage operation to move data between the primary storage subsystem and the tape data storage library, the third tape drive lease request including priority information associated with the third tape drive lease request; and
in response to determining that the third tape drive lease request has a higher priority than the first tape drive lease request, interrupt the first lease of the one or more tape drives granted to the first data storage cell such that access to the one or more tape drives is withdrawn from the first data storage cell and granted to the third data storage cell.

16. The system of claim 13, wherein the subset of tapes for the respective data storage cell is dedicated for use by that data storage cell and not by others of the plurality of data storage cells.

17. The system of claim 13, wherein each of the first storage operation and the second storage operation comprises one or more of a retrieval operation, a backup operation, a migration operation, a snapshot operation, or a replication operation.

18. The system of claim 13, wherein the first storage operation is a data retrieval operation comprising retrieving data from the tape data storage library, and the second storage operation is a data backup operation comprising writing data to the tape data storage library, wherein the lease-request-specific priority associated with the first storage operation is higher than the lease-request-specific priority associated with the second storage operation.

19. The system of claim 13, wherein the one or more computing devices are further configured to determine that the data-storage-cell-specific priority associated with the first data storage cell is higher than the data-storage-cell-specific priority associated with the second data storage cell based on the first type of data to be generated by the first data storage cell having a higher priority than the second type of data to be generated by the second data storage cell.

20. The system of claim 13, wherein each of the plurality of tapes has a barcode, and wherein the one or more computing devices are further configured to assign, for each respective data storage cell, a barcode range associated with the subset of the plurality of tapes.

* * * * *